US008606656B1

(12) United States Patent
Franklin et al.

(10) Patent No.: US 8,606,656 B1
(45) Date of Patent: Dec. 10, 2013

(54) FACILITATING ACCESS TO RESTRICTED FUNCTIONALITY

(75) Inventors: Patrick G. Franklin, Ravensdale, WA (US); Zheyin Li, Snoqualmie, WA (US); James K. Keiger, Seattle, WA (US); Suresh Kumar, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 1432 days.

(21) Appl. No.: 12/058,557

(22) Filed: Mar. 28, 2008

(51) Int. Cl.
*G06Q 30/00* (2006.01)

(52) U.S. Cl.
USPC .............................. 705/27.1; 726/6

(58) Field of Classification Search
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2; 726/6
See application file for complete search history.

(56) References Cited

U.S. PATENT DOCUMENTS

| | | | | |
|---|---|---|---|---|
| 7,096,266 | B2 * | 8/2006 | Lewin et al. | 709/226 |
| 7,249,262 | B2 * | 7/2007 | Hauck et al. | 713/184 |
| 7,293,098 | B2 * | 11/2007 | Sandhu et al. | 709/229 |
| 8,046,827 | B2 * | 10/2011 | Corella | 726/6 |
| 2002/0120757 | A1 * | 8/2002 | Sutherland et al. | 709/229 |
| 2003/0005308 | A1 * | 1/2003 | Rathbun et al. | 713/185 |
| 2003/0154403 | A1 * | 8/2003 | Keinsley et al. | 713/201 |
| 2003/0208562 | A1 * | 11/2003 | Hauck et al. | 709/219 |
| 2004/0061720 | A1 * | 4/2004 | Weber | 345/760 |
| 2004/0064418 | A1 * | 4/2004 | Koster et al. | 705/52 |
| 2005/0229101 | A1 | 10/2005 | Matveyenko et al. | 715/530 |
| 2005/0240869 | A1 | 10/2005 | Leetaru et al. | 715/530 |
| 2006/0089932 | A1 * | 4/2006 | Buehler et al. | 707/9 |
| 2007/0028162 | A1 | 2/2007 | Griffin et al. | 715/513 |
| 2007/0097655 | A1 | 5/2007 | Yampolsky et al. | 361/737 |
| 2007/0106543 | A1 * | 5/2007 | Baughman et al. | 705/7 |
| 2007/0192184 | A1 * | 8/2007 | Cai et al. | 705/14 |
| 2008/0016555 | A1 | 1/2008 | Krane | 726/5 |
| 2008/0115227 | A1 * | 5/2008 | Toutonghi | 726/29 |
| 2008/0313721 | A1 * | 12/2008 | Corella | 726/6 |
| 2009/0171802 | A1 | 7/2009 | Raygoza | 705/26 |
| 2011/0231892 | A1 * | 9/2011 | Tovar | 726/1 |

OTHER PUBLICATIONS

Joon S. Park et al. "Role-Based Access Control on the Web", ACM Transactions on Information and System Security, vol. 4, No. 1, Feb. 2001, pp. 37-71.*

(Continued)

*Primary Examiner* — Naeem Haq
(74) *Attorney, Agent, or Firm* — Seed IP Law Group PLLC

(57) ABSTRACT

Techniques are described for facilitating access of computing system users to restricted functionality, such as internal functionality of a business or other organization (e.g., internal systems and/or confidential information available to some or all business employees or other organization members). The restricted functionality access may in some situations be provided in conjunction with publicly available information from the organization, such as to use that publicly available information as part of a user interface that allows an authorized subset of users to access the restricted functionality. In some situations, the restricted functionality access may be facilitated by an access provider system that executes on a client computing system of an authorized user, such as a program operating in conjunction with another presentation program that presents publicly available information (e.g., as an extension program for the presentation program), and that modifies the interactions available to the user when using the presentation program.

21 Claims, 9 Drawing Sheets

(56) References Cited

OTHER PUBLICATIONS

Rosslin John Robles et al. "Application of Role-Based Access Control for Web Environment", 2008 International Symposium on Ubiquitous Multimedia Computing, IEEE 978-0-7695-3427-5/08.*

Trey Guerin et al. "How role-based access control can provide security and business benefits", ComputerWorld, Nov. 6, 2003.*

Won Bo Shim et al. "Implementing Web Access Control System for the Multiple Web Servers in the Same Domain Using RBAC Concept", 2001 IEEE 0-7695-1153-8/01.*

Aibek, "Greasemonkey Makes Firefox Ubeatable," Dec. 30, 2006, retrieved Mar. 28, 2008, from http://www.makeuseof.com/tag/greasemonkey-firefox-addon/, 11 pages.

"Greasemonkey," retrieved Mar. 27, 2008, from http://en.wikipedia.org/wiki/Greasemonkey, 5 pages.

* cited by examiner

FACILITATING ACCESS TO RESTRICTED FUNCTIONALITY

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace or item ordering service that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such human-initiated interactions between computers and programs (e.g., interactions initiated by users using Web browser programs to interactively request Web pages from Web servers), various systems are known in which multiple software programs interact in other manners in order to achieve a goal. For example, it is often desirable for an application program on a computer system to programmatically interact with other programs in order to obtain various types of information and functionality that are not part of the application program. In some situations, an application program may define one or more APIs ("application program interfaces") to allow other local or remote programs to interact with the application program in various ways and for various purposes. Various programmatic interaction mechanisms have also been developed, including remote procedure call ("RPC") protocols that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, UPnP ("Universal Plug and Play") and DCOM ("Distributed Component Object Model") provide similar capabilities. In addition, a variety of middleware programs have been implemented to connect separate applications (often of distinct types and from unrelated sources) to allow communication, including various EDI ("Electronic Data Interchange") networks. There is also growing use of the Web to provide so-called "Web services," which typically involve the programmatic interaction of remote applications to exchange information via defined APIs using a variety of underlying Web-based protocols and techniques, such as by returning data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes as part of Web services, such as SOAP ("Simple Object Access Protocol") for standard message exchange, WSDL ("Web Services Description Language") for description of service invocations, and UDDI ("Universal Description, Discovery, and Integration service") for discovery of available services.

DETAILED DESCRIPTION

Figure 1:
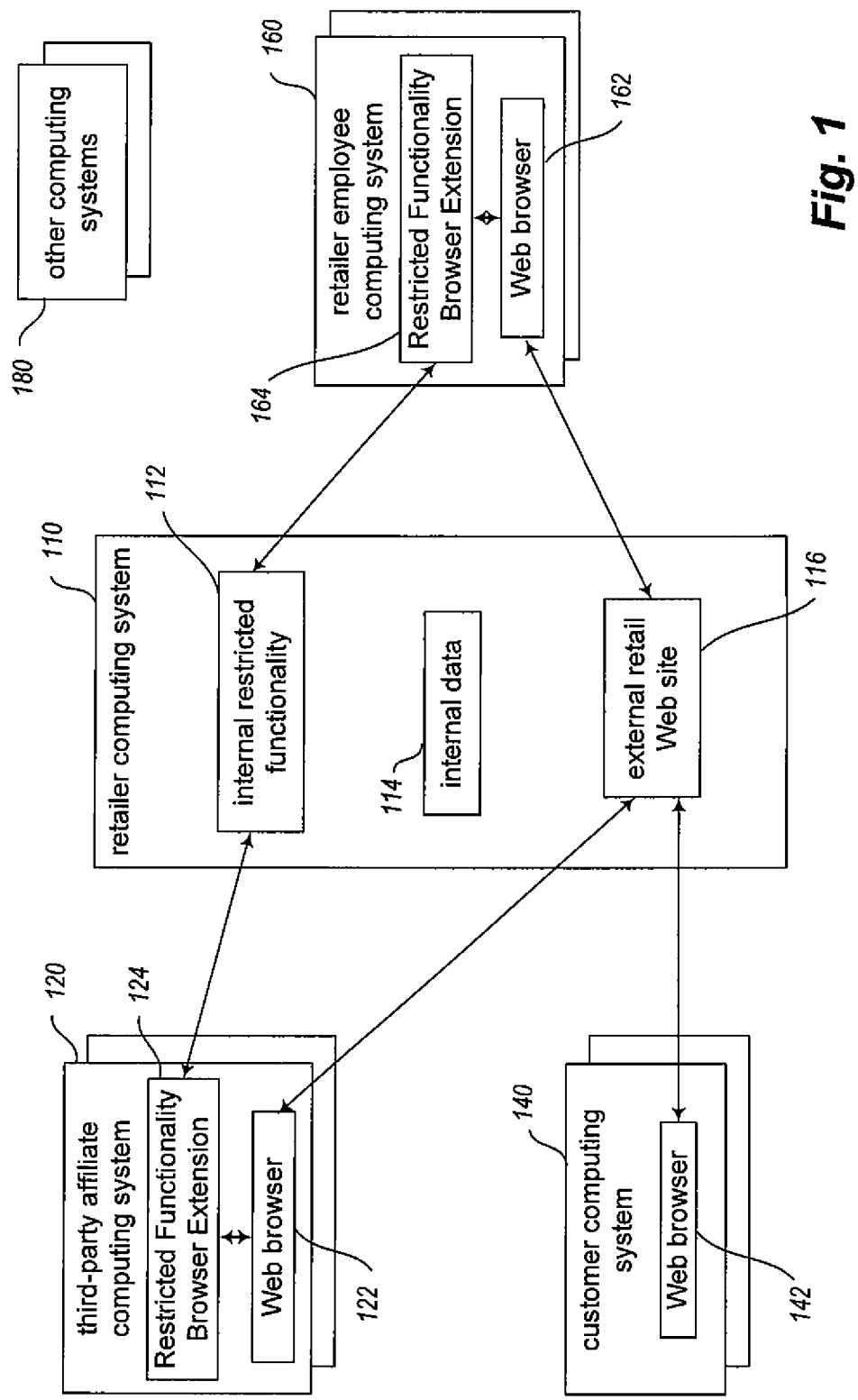
FIG. 1 illustrates examples of various types of interactions to facilitate access to restricted functionality.

Techniques are described for, among other things, facilitating access of users of computing systems to restricted functionality or other functionality that is not currently available. In at least some embodiments, the restricted functionality may include internal functionality of a business or other organization, such as functionality available to a subset of users who are authorized to access internal systems of and/or confidential information of the organization (e.g., some or all business employees or other organization members, or who have other predefined relationships with the organization). In addition, in at least some embodiments, the access to the restricted functionality is provided in conjunction with information that the organization makes publicly available to any users (e.g., users that are not business employees or other organization members), such as to use that publicly available information as part of a user interface that allows the authorized subset of users to access the restricted functionality. As one specific example, in some embodiments, the organization may be a Web retailer business that sells or otherwise makes items available to consumers via Web pages of the business' Web site (e.g., a Web store site), and an authorized user that accesses a Web page corresponding to one of the items may obtain access to the business' internal systems corresponding to the item. Authorized users may be identified in various ways, and access to a variety of types of restricted functionality may be provided to the authorized users in various ways, as discussed in greater detail below. In addition, in at least some embodiments, at least some of the described techniques are automatically performed by an embodiment of a restricted functionality access provider system.

In some embodiments, the access to the restricted functionality may be facilitated by a restricted functionality access provider system that executes on a client computing system of a user, such as a restricted functionality access provider software program that operates in conjunction with one or more other presentation programs that present information to the user (e.g., as an extension or helper program for the presentation program). In such embodiments, the restricted functionality access provider system may provide access to the restricted functionality via the other presentation program at various times (e.g., while the presentation program is presenting publicly available information from a remote computing system operating on behalf of an entity, and the restricted functionality is available from that remote computing system or from one or more other remote computing systems operating on behalf of the entity). In addition, the restricted functionality access provider system may in some embodiments and situations determine whether and how to provide access to a user to restricted functionality from a remote entity based at least in part on information about the user, such as whether the user is authorized to obtain that access (e.g., based on a relationship of the user to the remote entity, such as being an employee or having another predefined type of relationship).

The restricted functionality access provider system may provide access to the restricted functionality via the other presentation program in various ways in various embodiments, such as by adding or otherwise modifying interactions that are available to the user when using the presentation program. For example, in some embodiments, the restricted functionality access provider system may be an extension or helper program for the presentation program (e.g., based on using a defined API of the presentation program that enables such extension or helper programs) or otherwise configured to execute in conjunction with the presentation program, such as if the presentation program is a Web browser program and the restricted functionality access provider system is a toolbar extension program (e.g., an applet, plug-in, executable script, etc.) for the Web browser program, while in other embodiments the restricted functionality access provider system may have other forms (e.g., a stand-alone application program). In at least some such embodiments, a user interface of the restricted functionality access provider system may be displayed to users as part of the user interface of the presentation program (e.g., as a toolbar user interface), and if so some or all of the interactions to access the restricted functionality may be made available to users via user-selectable controls or other user-selectable options of the user interface of the restricted functionality access provider system. In addition, in some embodiments, some or all of the interactions to access the restricted functionality may be made available by the restricted functionality access provider system to users directly via the information presented by the presentation program, such as via user-selectable controls or other user-selectable options that are dynamically and temporarily added to the presented information or that are otherwise made temporarily accessible via the presented information in response to user interactions with the presented information (e.g., as choices added to a menu of user-selectable options that the user may request, such as via a right-click interaction with the presented information). Similarly, in some embodiments, some or all of the interactions to access the restricted functionality may be made available by the restricted functionality access provider system to users directly via the information presented by the presentation program, such as via user-selectable controls or other user-selectable options that are dynamically added before the information is presented to the user (e.g., as the information is loaded for initial presentation, such as to add user-selectable controls or other additional information bodily within the information to be presented and/or as additional user-selectable options that are available when existing user-selectable controls or other information of one or more types is interacted with, such as with existing images and/or existing hyperlinks).

In some embodiments, the restricted functionality access provider system may provide access to restricted or other functionality via another presentation program by temporarily modifying the information being displayed by the presentation program, such as to display additional user-selectable controls and/or other additional information corresponding to the functionality. For example, the temporary modifying of the information being displayed may in some embodiments include temporarily modifying a copy of the information in volatile memory that is used to generate a visual representation being displayed to the user by the presentation program, such as a temporary copy of the information loaded in random access memory associated with the presentation program, and then later removing the modifications after the user has completed use of the additional information. In addition, the temporary modifying may be performed in a dynamic manner, such as in response to a user interaction with the displayed visual representation, and may be performed without modifying any persistent copies of the information being presented (e.g., as stored on local storage and/or on remote storage). If the information being displayed is a Web page and the presentation program is a Web browser, for example, the temporary Web page copy in memory may be temporarily modified to add one or more HTML elements, such that an updated visual representation of the Web page that is generated from the modified Web page copy includes additional information based on the added HTML elements. The additional information based on the added HTML elements may be, for example, obtained from a remote source, such as by dynamically accessing functionality from the remote source on behalf of the user at a time of the generating of the updated visual representation.

In addition, in at least some embodiments, the access to restricted or other functionality that is provided to a user may be based at least in part on the particular information that is currently being presented to the user and/or on particular interactions of the user with the presented information. For example, in situations in which the presented information is a Web page from a retailer business that sells or otherwise makes items available to consumers via Web pages of the business' Web site, at least some such Web pages are each likely to have one or more of the items as the subject area of the Web page. Furthermore, such item-specific Web pages may display information about various attributes and other aspects regarding the subject area of the Web page, such as price, inventory availability, weight, a description, etc. for an item-related subject area. In such situations, the types of functionality to which the user is provided access may be based at least in part on the subject area of the presented Web page, such as to provide access to functionality related to an item (e.g., confidential information of the retailer about historical pricing for the item and/or recent profit margins for the item) if the Web page is specific to that item. In addition, in the user indicates a particular aspect of the Web page (e.g., by performing a right click interaction with text corresponding to a particular item attribute), the resulting types of functionality to which the user is provided access (e.g., as user-selectable options on a context menu that is displayed in response to the right click interaction) may be modified to reflect that particular subject area aspect. The subject area(s) and subject area aspects of a group of information may be determined in various ways in various embodiments, as discussed in greater detail below. Additional details related to how and when the restricted functionality access provider system provides user access to functionality in various embodiments are included below, including details related to dynamically and temporarily modifying information being displayed.

FIG. 1 illustrates examples of various types of interactions between multiple computing systems, with various client computing systems using embodiments of a restricted functionality access provider system to provide users with access to restricted functionality provided by a remote server computing system. In this illustrated example, the client systems execute Web browser presentation programs, and the restricted functionality access provider systems are Web browser extension programs configured to execute in conjunction with the Web browser programs. In other embodiments, the restricted functionality access provider systems and/or presentation programs may have other forms and may interact in other manners, including in some embodiments to have a restricted functionality access provider system that directly provides access to users to at least some types of restricted functionality without interacting with a distinct presentation program.

In particular, the illustrated example of FIG. 1 includes a remote retailer computing system 110 that is operated on behalf of a retailer business, and other computing systems that interact with the computing system 110 to obtain access to various functionality. The other computing systems include one or more customer computing systems 140 that are operated by users (not shown) who are customers of the retailer business, one or more retailer employee computing systems 160 that are operated by users (not shown) who are employees of the retailer business, one or more third-party affiliate computing systems 120 that are operated by users (not shown) who are each associated with a third-party affiliate of the retailer business (e.g., a business partner, such as a vendor, supplier, distributor, etc.), and optionally one or more other computing systems 180. Each of the computing systems 120, 140 and 160 is executing one or more software programs on behalf of one or more respective users, such that the software programs are interacting with one or more other programs executed by the retailer computing system 110. Although not illustrated in FIG. 1, the computing systems 110, 120, 140, 160, and 180 may be interconnected via one or more networks over which interactions between the various computing systems occur. For example, in some embodiments, the network may be a publicly accessible network of linked networks, possibly operated by various distinct parties, such as the Internet. In other embodiments, the network may be a private network, such as, for example, a corporate or university network that is wholly or partially inaccessible to non-privileged computing systems. In still other embodiments, the network may include one or more private networks with access to and/or from other private and/or public networks.

The illustrated retailer computing system 110 includes one or more services 112 that provide internal restricted functionality of the retailer business, a Web server 116 that provides an external retail Web site having publicly accessible information regarding the retailer business (e.g., information about items that the retailer sells), and internal data 114 that may be used by the services 112 and/or the Web server 116. The illustrated client computing systems 120, 140, and 160 are each executing a Web browser program 122, 142, and 162, respectively, which is interacting with the external retail Web site via Web server 116 on behalf of a respective user (not shown), such as to obtain from the external retail Web site 116 one or more Web pages that may be presented to the respective user on their client computing systems. In addition, computing systems 120 and 160 are each executing a copy of a Restricted Functionality Browser Extension program 124 and 164 respectively, which is operating in conjunction with its respective host Web browser 122 and 162, as well as interacting with the services 112 that provide the internal restricted functionality so as to facilitate access for a respective user of the client computing system to that internal restricted functionality. In particular, as the Web browsers 122 and 162 obtain Web pages from the external retail Web site and present those Web pages to the users of the computing systems 120 and 160, the Restricted Functionality Browser Extension programs 124 and 164 may automatically provide access for the users to at least some of the internal restricted functionality services 112 via those Web pages being presented by the Web browsers 122 and 162. For example, in some embodiments, some or all of the internal restricted functionality services 112 may each be associated with one or more Web pages of the retail Web site, such as based on those services providing types of functionality that correspond to subject areas of those Web pages.

In some embodiments, the Restricted Functionality Browser Extension programs 124 and 164 may further automatically provide access for respective users to other restricted functionality services as the respective host Web browsers obtain and present Web pages from one or more other Web sites, such as one or more other Web sites provided by entities other than the retailer (e.g., entities operating the one or more other computing systems 180). Alternatively, as the Web browsers 122 and/or 162 obtain and present Web pages from one or more other Web sites (e.g., via the one or more other computing systems 180), the Restricted Functionality Browser Extension programs 124 and/or 164 may not automatically provide access for respective users to any restricted functionality services, such as based on those other presented Web pages not being provided by entities that provide access to restricted functionality or otherwise not being associated with corresponding restricted functionality.

The illustrated retailer computing system is in this example operated by a Web merchant retailer business that provides items to customers via the retail Web site, such as to enable users to search for, shop for and order items (such as products, services and/or information) that are for purchase, rent, lease, license, trade, evaluation, sampling, subscription, etc. For example, users may visit the external retail Web site 116 to view information about one or more items, place an order for one or more items, and/or provide information needed to complete a purchase of one or more items (e.g., payment and shipping information).

In addition to providing the external retail Web site, the example retailer computing system 110 provides internal restricted functionality services 112, such as may be used by employees of the retailer via a private network (not shown) of the retailer, and via various tools or other programs (not shown) that are specific to the various services 112. As is discussed elsewhere, the restricted functionality may include one or more types of functionality that are available for use by authorized users, such as functionality that may be provided via various types of applications, services, tools, utilities, and other types of software. In some embodiments, the internal restricted functionality services 112 may provide access to internal operations, systems, and information (e.g., such as internal data 114) of the retailer computing system 110, and users may be authorized to obtain access to at least some of the internal restricted functionality services 112 based in part on the user being part of a group that is associated with the retailer in one or more ways (e.g., employment, third-party affiliation, etc.). For example, in the illustrated embodiment of FIG. 1, users of third-party affiliate computing systems 120 may be authorized to access a first group (not shown) of the internal restricted functionality services 112 that correspond to one or more types of third-party affiliates (e.g., services 112 related to supply chain management), while users of the retailer employee computing systems 160 may be authorized to access a distinct second group (not shown) of the internal restricted functionality services 112 related to employee-specific functionality (e.g., to manage inventory and pricing for existing items, to add new items, to modify descriptions of and other information related to existing items, etc.).

In some embodiments, the Restricted Functionality Browser Extension programs 124 and 164 may further perform other interactions with the retailer computing system 110 on behalf of their respective users, such as to determine whether the respective users are authorized to obtain access to any or all of the services 112 or to particular services 112 (e.g., by obtaining and providing user login information to the retailer computing system 110, such as usernames and passwords provided by the users). In some embodiments, the programs 124 and 164 may further obtain information from the retailer computing system associated with the respective user's authorization, if any, such as information including one or more digital certificates, indications of permissions, indications of one or more of the internal restricted functionality to which the respective user is authorized to use, etc. In addition, the Restricted Functionality Browser Extension programs 124 and 164 may in some embodiments interact with the retailer computing system 110 to obtain information about which of the services 112 correspond to which of the Web pages of the Web site, while in other embodiments the programs 124 and 164 may determine such mappings in other manners (e.g., based on information encoded in or configured for the programs 124 and 164). Furthermore, in at least some embodiments, the programs 124 and 164 may be provided by the retailer business to the computing systems 120 and 160 to facilitate access of authorized users to restricted functionality of the retailer, such as by configuring the programs 124 and 164 to use retailer-specific information to perform at least some of its operations (e.g., to determine whether users are authorized, to identify subject areas of particular Web pages, to determine particular services 112 that correspond to particular Web pages or pieces of information within Web pages, etc.).

In the illustrated example of FIG. 1, the customer computing systems 140 do not include copies of the Restricted Functionality Browser Extension system, such as based on those customer users not being authorized to access the internal restricted functionality services 112 and/or based on the computing systems 140 not being authorized to obtain the Restricted Functionality Browser Extension system copies from the retailer or other supplier. In other embodiments, one or more of the customer computing systems 140 may be executing a copy of a Restricted Functionality Browser Extension system in conjunction with the host Web browser 142, such that a user interacting with one of the one or more such customer computing systems may be provided access to at least some of the internal restricted functionality services 112 in at least some situations (e.g., if that user is authorized). For example, some customer users may be authorized to obtain access to at least some of the internal restricted functionality services 112, such as based on the customer users being selected as preferred customers that are provided with additional services and/or based on the customer users having some other authorization obtained from the retailer. Similarly, in some embodiments, one or more other computing systems 180 may each be executing Restricted Functionality Browser Extension system copies in conjunction with a host Web browser or other presentation program to obtain access to at least some of the internal restricted functionality services 112 for which their users are authorized.

It will be appreciated that, although the example embodiment of FIG. 1 has been described with respect to specific types of environments, users, computing systems, software, etc., the described techniques may be used in a variety of other situations. For example, although FIG. 1 has been described with respect to a retailer Web site, the described techniques may be used in a wide variety of other environments, including with Web sites or other types of information available from other types of entities (e.g., nonprofit organizations, public organizations, individuals, businesses other than a retailer Web site, etc.). In addition, in some embodiments, access to restricted functionality from a first source may in be provided in conjunction with Web pages or other presented information from one or more other sources, including from other sources that are unaffiliated with or otherwise unrelated to the first source (e.g., based on the restricted functionality corresponding to subject areas of the information from the other sources). Furthermore, in various embodiments, types of users other than employees and third-party affiliates may be authorized to obtain access to restricted functionality, and types of interactions other than Web-based may be used in accordance with the described techniques (e.g., using other types of client-server software applications, other types of electronically accessible sites available via the Internet or other communication network, etc.).

As previously mentioned, the restricted functionality access provider system may in some embodiments provide a user with access to restricted functionality based at least in part on that restricted functionality being related to information being presented to the user (e.g., by the restricted functionality access provider system or other presentation program), such as based on one or more subject areas of the presented information. In some embodiments, the described techniques include the restricted functionality access provider system automatically identifying one or more subject areas for a Web page or other group of information in various ways, such as by analyzing the group of information to identify a topic or category associated with the group of information (e.g., based on identifying particular keywords or more generally performing inference, such as based on natural language processing), by searching for one or more predefined types of identifiers (e.g., based on a pattern for that type of identifier) that correspond to a particular type of information (e.g., a phone number or social security number corresponding to a particular person, an ISBN number corresponding to a book, an item identifier corresponding to a particular item provided by a retailer, etc.), by receiving information from a provider of the presented information that characterizes the presented information in one or more ways, etc. For example, automatic identification of one or more subject areas related to a group of information may include parsing text-based information (e.g., after obtaining a copy of the presented information from the presentation program or original source of the information or by screen scraping the presented information), examining a Document Object Model or other metadata associated with an HTML-based and/or XML-based group of information, analyzing a URL or other information about a source of the information, etc. Furthermore, in some embodiments, the provider of a group of information may insert one or more indications into the information for use in identifying one or more subject areas, such that identifying the subject area may involve analyzing the information to find the inserted indications.

In addition, in some embodiments, a subject area corresponding to a group of information may have multiple associated aspects. For example, the subject area may correspond to an object or activity that has multiple associated attributes or other related aspects, with a group of information including multiple pieces of information that correspond to the various attributes or other aspects. In at least some such embodiments, one or more types of restricted functionality may be provided for access to a user based at least in part on it corresponding to one or more of the multiple associated aspects. For example, a business that provides information about items may provide various Web pages that each have a subject area corresponding to one or more of the items, as discussed in greater detail with respect to FIGS. 2A-2E, and a particular Web page for a particular item may have information about various attributes or other aspects of the item (e.g., weight, size, price, availability, color, category, etc.). In such situations, a user may indicate a particular aspect in various ways (e.g., by right-clicking or left-clicking a location of or portion of the presented information that corresponds to that attribute, such as a location or portion that is a user-selectable or non-user-selectable display of information about a value for or other information about that particular aspect), and the restricted functionality access provider system may make available one or more types of restricted functionality that correspond to that indicated aspect (e.g., by adding user-selectable controls for those restricted functionality types to a pop-up contextual menu or in another manner). The Web pages provided by the business may be part of a customer-facing Web site of the business, such as to enable customers to acquire one or more available items by interacting with the Web pages. In such a situation, such a Web page may allow an authorized user (e.g., an employee) to access various types of internal restricted functionality of the business that correspond to the one or more items that are the subject area of the Web page. Such restricted functionality may include, for example, viewing sales information related to one or more items, managing inventory of one or more items (e.g., by viewing a current inventory and supply chain, and executing orders for additional inventory as appropriate), editing information associated with one or more items (e.g., information displayed to a customer in a customer-facing Web page, or other information used by the business), etc., such as after the authorized user indicates a corresponding subject area aspect from the presented information.

In some embodiments, as part of providing a user with access to one or more types of restricted functionality, the restricted functionality access provider system may interact with one or more remote systems on behalf of the user, such as to supply information specified by the user and/or to receive and present additional information received from the remote systems. The interactions may be performed in various manners in various embodiments, including by using various communication protocols such as HTTP, HTTPS, etc. In addition, the display or other presentation to the user of received additional information may be performed in various manners in various embodiments. For example, in some embodiments, additional information to be presented may include one or more of images, text, charts, figures, graphs, tables, audio, video, etc. related to the restricted functionality, and may in some situations also include one or more user-selectable controls (e.g., buttons, menus, hyperlinks, switches, textboxes, checkboxes, radio buttons, etc.) related to the invoked restricted functionality, such that the user may interact with the restricted functionality in various ways via that additional presented information. In various embodiments, the additional information may be presented to the user using one or more of pop-up windows, dialog boxes, a user interface of the restricted functionality access provider system, etc., or in some embodiments by temporarily modifying a copy of a group of information in volatile memory that is used to generate a visual representation being displayed to the user by the presentation program. For example, in some embodiments, a temporary copy of a Web page may be loaded into volatile memory for display to a Web browser user, and in such embodiments the temporary copy of the Web page may be temporarily modified to include the additional information and/or to include one or more corresponding user-selectable controls, such as by inserting one or more HTML elements related to the information into the temporary copy of the Web page in volatile memory for presentation to the user via the Web browser, such as without modifying a persistent copy of the Web page stored locally or remotely such that a later load of the persistent Web page copy will not include the modifications. It will be appreciated that restricted functionality, once invoked, may operate on behalf of a user in a wide variety of other ways. For example, in some embodiments, a user may access one or more types of restricted functionality that does not display additional information to a user, such as if the restricted functionality is based on one or more internal systems that execute in the background (e.g., a batch process).

As previously noted, in some situations at least some restricted functionality may be provided by an entity (e.g., an organization; an individual; etc.) so that one or more authorized users may obtain access to various internal restricted functionality of the entity (e.g., internal operations and systems, confidential information, etc.). In some embodiments, such restricted functionality may be provided by tools or other services that allow users to view and/or manage information presented on a Web page or associated metadata. For example, restricted tools for managing information/content presented on a Web page may include tools for editing various information of the Web page, such as text (e.g., descriptions and/or reviews of items on a retail Web site), images (e.g., by adding, removing, changing images appearing on a Web page), etc. When the entity is a retail item providing business, such restricted functionality may include, for example, functionality related to sales (e.g., current, historical, forecasting, etc.), inventory, procurement, customer demand, customer orders, costs, profit margins, promotions, rebates, shipping information (e.g., shipping methods, costs, etc.), product information (e.g., types, characteristics, descriptions, images, price, etc.), competitor pricing, etc. In some embodiments, such restricted functionality for a retail item business may include tools for use by users who procure or otherwise manage products for the retailer (e.g., a buyer, purchasing agent, etc.), such as, for example, tools to analyze and manage inventory, pricing, etc. In addition, in some embodiments, internal restricted functionality may include tools for use by users associated with other entities who supply goods to the retailer (e.g., vendors, suppliers, etc.) or who have another type of business relationship with the retailer.

For illustrative purposes, some embodiments are described below in which specific types of interactions occur between specific types of presentation programs and restricted functionality access provider systems to provide specific types of users with access to specific types of restricted functionality in specific situations. However, it will be appreciated that the described techniques may be used in a wide variety of other situations, including with other types of software applications, parties, functionality and interactions, and that the invention is not limited to the exemplary details provided.

FIGS. 2A-2E illustrate examples of facilitating user access to restricted functionality. In particular, in these examples, a Web browser extension program acts as a restricted functionality access provider system, such as by being configured to execute in conjunction with a Web browser presentation program, although in other embodiments other types of restricted functionality access provider systems and/or presentation programs may be used.

Figure 2A:
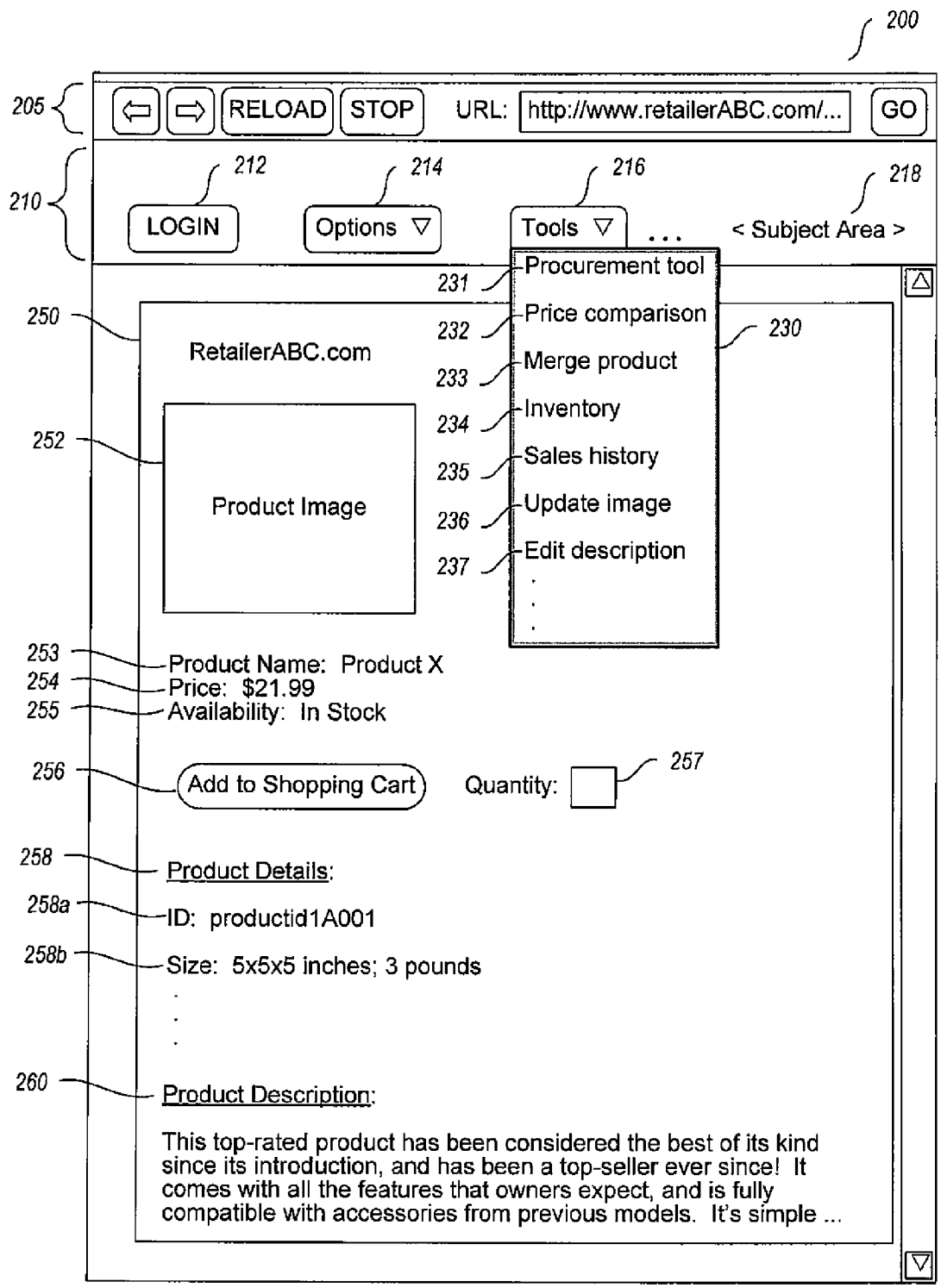
FIGS. 2A-2E illustrate examples of facilitating user access to restricted functionality.

FIG. 2A illustrates an example Web browser program user interface 200, which in this example is displaying a visual representation 250 of a Web page obtained from a Web site that provides information about items available to be acquired by customers. In this example, the displayed Web page has a subject area corresponding to an example product item "Product X" that is available via the Web site, and includes various information related to various aspects of the product. The attributes of the product in this example include a product image 252, a product name 253, a product price 254, product availability information 255, various other product details 258 (e.g., a unique product identifier 258a, product size information 258b, etc.), and a textual product description 260. In addition, the displayed Web page includes other information, such as user-selectable controls available for a user to initiate a purchase of the product (e.g. an "Add to Shopping Cart" button 256 that allows a user to add the product to an electronic shopping cart, and an editable textbox 257 that allows a user to specify a particular quantity of the product to add to the electronic shopping cart). It will be appreciated that other Web pages related to other subject areas may be displayed in Web browser user interface 200 and may have other types of subject area aspects, and that information may be organized and displayed in other manners in other embodiments. The illustrated Web browser user interface 200 also includes various user-selectable controls 205, such as, for example, forward and back arrow buttons to navigate a browse history, a RELOAD button to refresh the displayed visual representation of a loaded Web page by retrieving a new copy of the Web copy from its source (e.g., a remote Web site), a STOP button to interrupt loading and display of a Web page, an editable URL textbox for use in indicating an address of a Web page to be loaded, and a GO button to retrieve a Web page from an address indicated in the URL textbox. In other embodiments, other user-selectable controls may be available as part of the user interface of the Web browser, such as from one or more drop-down menus (not shown).

In the example of FIG. 2A, a computing device (not shown) executing the Web browser is also executing a Web browser extension program that is an embodiment of a restricted functionality access provider system, such as to facilitate providing users of the Web browser with access to one or more types of restricted or other functionality. In this example, the Web browser extension program is displaying a toolbar user interface 210 as part of the user interface 200 of the Web browser, with the toolbar user interface including a number of user-selectable controls that include a LOGIN button 212, an Options menu button 214, and a Tools menu button 216, as well as an indication of a subject area 218 related to the currently presented Web page. It will be appreciated that in some embodiments multiple toolbar user interfaces may be simultaneously displayed that correspond to multiple extension programs and/or other programs executing in conjunction with the Web browser. In some embodiments, one or more types of restricted functionality may be provided by an entity for use by one or more authorized users, such as the example entity "RetailerABC" providing access to internal users (e.g., employees) or other authorized users, and in such embodiments the Web browser extension program provides access for authorized users to the one or more types of restricted functionality via one or more corresponding Web pages. In addition, while the extension program is illustrated in this example as having a toolbar user interface 210, in other embodiments the user interface may have other forms, or the extension program may provide capabilities to the user without using a distinct user interface (e.g., by modifying interactions that are available via the displayed Web page or otherwise via the user interface of the Web browser program).

In the illustrated embodiment, a user of the Web browser may interact with the LOGIN button 212 to identify himself or herself, such as to enable the Web browser extension program to determine whether the user is authorized to obtain access to one or more types of restricted functionality. For example, in some embodiments, when a user interacts with the LOGIN button 212, a sign-in user interface window (not shown) may be presented to the user to enable the user to provide authorization-related information (e.g., one or more usernames, passwords, etc.). In at least some embodiments, the Web browser extension program may authorize the user by interacting with one or more remote servers (e.g., servers of RetailerABC), such as by providing the user's authorization information and obtaining information associated with the user's authorization level, if any. For example, such obtained authorization level information may include one or more indications of one or more types of restricted functionality to which a user is authorized to obtain access, one or more indications of various other permissions (e.g., permissions associated with one or more other features provided by the Web browser extension program), one or more digital authentication certificates for use in securely identifying the user when obtaining access to at least some of the restricted functionality, etc. In addition, in some embodiments, access to the Web browser extension program may be password protected, such that a user may be required to enter a password to execute the extension program and/or to access features provided by the extension program, and if so the LOGIN button 212 may similarly be used to allow the user to provide information related to accessing features. A user may indicate authorization-related information or otherwise obtain authorization to use one or more types of restricted functionality in various other ways in other embodiments.

In the illustrated embodiment, the Web browser extension program may also automatically determine one or more subject areas related to the displayed Web page, and provide the user with access to one or more types of restricted functionality related to the subject area(s) if the user is so authorized. In particular, in the illustrated embodiment, the Web browser extension program may temporarily modify the dropdown menu 216 to provide access to selected restricted functionality types (or enable/disable access to the dropdown menu), such as by adding one or more user-selectable controls or other options to the menu that correspond to the one or more types of restricted functionality. For example, as previously noted, the Web browser extension program may identify the currently displayed Web page as being related to the "Product X" item, such as based on the presence of the product identifier 258a and/or on other information associated with the Web page (e.g., the displayed product name 253, non-displayed metadata associated with the Web page, etc.). Thus, after a user selects the illustrated Tools menu button control 216, the example dropdown menu 230 may be displayed to the user so as to provide access to types of restricted functionality that correspond to the subject area 218, such that a user may initiate access to a particular restricted functionality type by selecting a corresponding user-selectable option from the dropdown menu 230.

In the illustrated example, the dropdown menu 230 includes user-selectable options corresponding to restricted functionality types that include a procurement tool 231, a price comparison tool 232, a merge product tool 233, an inventory tool 234, a sales history tool 235, an update image tool 236, an edit description tool 237, etc., at least some of which have been made available for access to the user based at least in part on being related to a subject area of the displayed Web page and the user authorization level. For example, the procurement tool 231 may enable a buyer employee to manage procurement of this or other products from vendors, the price comparison tool 232 may provide information about one or more competitors' price for this or other products for comparison purposes, the merge product tool 233 may allow the user to manage how products are tracked and/or identified to users (e.g., to indicate that two or more distinct product identifiers have inadvertently been assigned to a single item and should be merged or otherwise grouped together), the inventory tool 234 may allow the user to manage inventory of this or other products, the sales history tool 235 may provide information about historical sales of this or other products, the update image tool 236 may allow the user to persistently edit one or more product images of this or other products to be displayed as part of their respective Web pages, and the edit description tool 237 may allow the user to persistently edit one or more descriptions of this or other products to be displayed as part of their respective Web pages. More generally, a retailer entity may provide a wide variety of types of restricted functionality in at least some embodiments, such as, for example, tools for forecasting and/or tracking sales of retail products; tools for procuring retail products from vendors; tools for managing inventory of retail products; tools for editing information associated with retail products (e.g., images, price, characteristics, descriptions, manufacturer reviews, seller reviews, customer reviews, size, etc.); tools for obtaining competitor price comparisons; tools for managing sales campaigns and promotions, tools for managing various employee-related data, etc. Web pages with other types of subject areas may have other types of corresponding available restricted functionality (e.g., for a Web page from RetailerABC that is a monthly aggregate sales report with a corresponding subject area, the menu 230 may not include information about updating an item image or obtaining item price comparison information, but may include other additional types of restricted functionality such as may be related to analyzing monthly aggregate sales), and other types of entities may similarly provide other types of restricted functionality.

In addition, in some embodiments, users may be authorized to obtain access to restricted functionality based at least in part on the user belonging to a group of users who are associated with an entity providing the restricted functionality (e.g., by employment, third-party affiliation, etc.). For example, a retail entity may provide one or more groups of restricted functionality for use by one or more groups of third-party users who provide products and/or services to the entity (e.g., vendors, suppliers, shippers, distributors, etc.). It will be appreciated that various other types of associations for authorizing use of various types of restricted functionality may exist in various other embodiments. In addition, in some embodiments, one or more types of restricted functionality may be provided so that an authorized user may manage at least some aspects of the visual representation of the Web page, such as, for example, tools for persistently editing text, graphics, layout, etc. It will be appreciated that various other types of restricted functionality may be provided in other embodiments.

As previously discussed, the Web browser extension program may provide access for a user to one or more types of restricted functionality based at least in part on one or more subject areas of a displayed Web page or other group of information being presented to a user by the Web browser. For example, in some embodiments, a subject area may be identified based on being a primary topic or encompassing principle of the information being displayed. In addition, the Web browser extension program may identify a subject area associated with a Web page in various ways, such as by automatically analyzing information included with the displayed Web page (e.g., by parsing textual information included in the Web page), by examining Document Object Model (DOM) metadata associated with the Web page, etc. In some embodiments, various types of information indicating various subject areas may be explicitly included in the Web page by the provider of the Web page, such as keywords, identifiers, etc, and in such embodiments, the Web browser program may identify the subject matter by analyzing the information included in the Web page to locate that explicitly included information. The Web browser extension program may use one or more other techniques to infer a subject area from the Web page in other embodiments, such as pattern matching, natural language processing, image analysis, etc., or alternatively a user may interact with the Web browser extension program user interface 210 to specify a subject area of the displayed Web page.

In the illustrated embodiment, after a subject area has been identified, the Web browser extension program user interface 210 displays an indication of the identified subject area in the displayed toolbar user interface, such as via indication 218. For example, in some embodiments, if the subject area is associated with a product, the product name or product identifier may be displayed as indication 218. In other embodiments, other types of indications (e.g., text, symbols, pictures, etc.) may be displayed to indicate an identified subject area, or the toolbar may not display an indication of the identified subject area. Furthermore, in some embodiments, the Web browser extension program may not identify a subject area for some or all Web pages or other information groups, and if so, all or none of the restricted functionality types may be made available.

In this example, the Options menu button control 214 may be provided to allow a user to configure various aspects associated with the operation of the Web browser extension program, such as via a dropdown menu (not shown) or other user interface that is displayed upon selection of the control 214. For example, in some embodiments, the user may be able to configure some or all user-selectable controls or other options that are displayed to the user via the toolbar user interface 210 in at least some situations (e.g., to indicate which restricted functionality tools to make available via menu 230 if the Web page's subject matter is one or more items), may indicate one or more preferred controls for display to the user in various ways (e.g., such as a preferred order in which restricted functionality types are presented to the user for access), may configure a locality or other information about the user, etc.

Figure 2B:
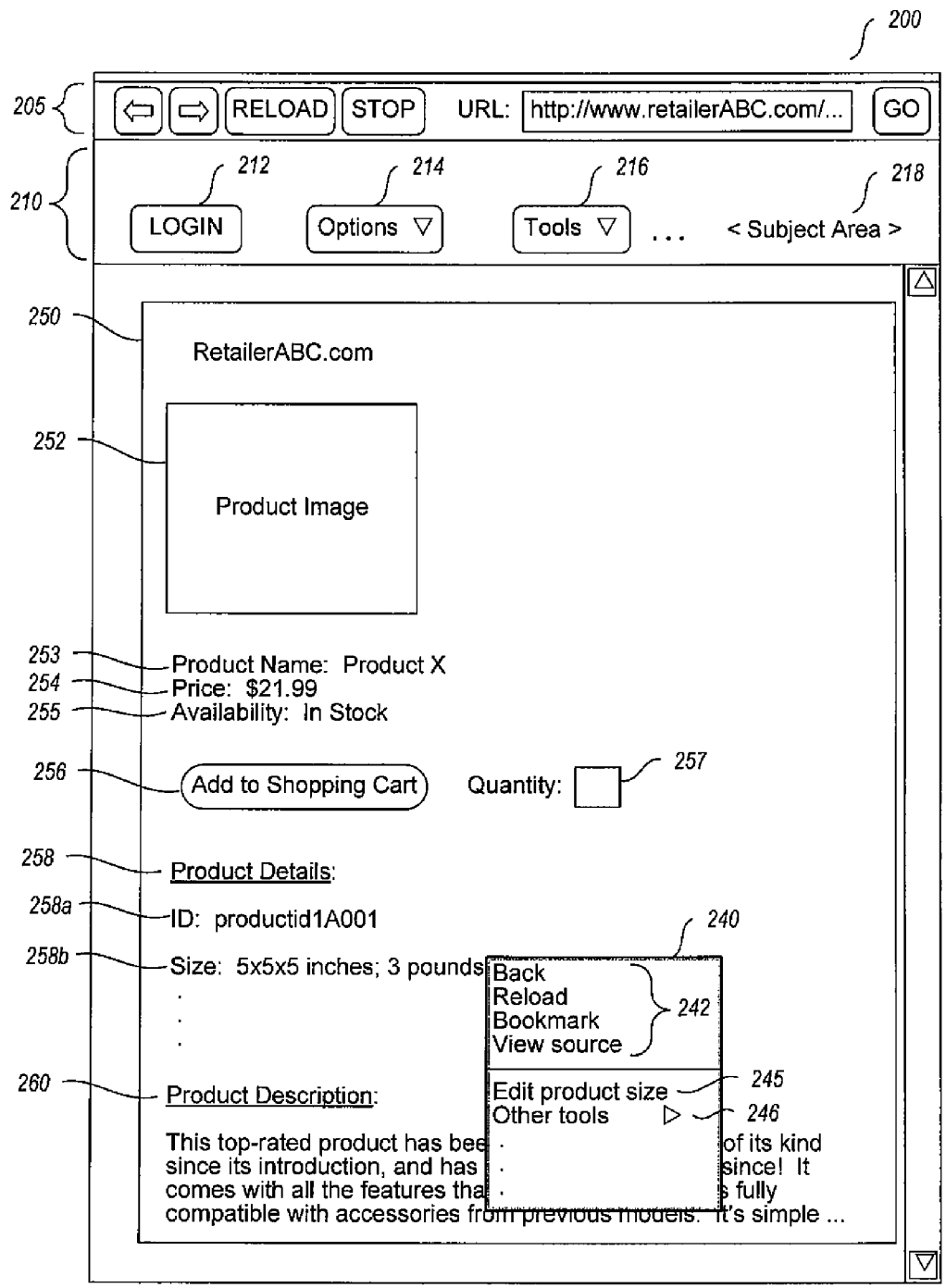

FIG. 2B continues the example of FIG. 2A, but with a context menu 240 being displayed in the Web browser user interface 200, such as resulting from a user performing an initial right click interaction with the displayed Web page or other related interaction. The displayed context menu 240 includes multiple default user-selectable menu options 242 (e.g., Back, Reload, Bookmark, and View source) that correspond to functionality provided by the Web browser, and may be automatically included in some or all context menus by the Web browser. In addition, in this example, the context menu 240 further includes one or more additional user-selectable options that may provide access to one or more types of restricted functionality, such as are dynamically added to the context menu 240 by the Web browser extension program (e.g., via a corresponding API provided by the Web browser program) based on the user's initial interaction with the displayed Web page, and/or are added by the Web browser extension program to all such context menus to provide access to functionality that is not specific to the user's initial interaction. In this example, the additional user-selectable options include an Edit product size menu option 245 and an Other tools submenu control 246, with the submenu control 246 providing one or more other user-selectable options as part of an additional displayed submenu (not shown). For example, the user may invoke one or more types of restricted functionality by either selecting the Edit product size menu option 245, or by selecting the Other tools submenu control 246 and selecting one or more corresponding options accessible from the resulting submenu. In other embodiments, a particular type of restricted functionality may instead be invoked on the user's behalf as a response to the initial interaction without use of a context menu, such as if that type of restricted functionality is the only restricted functionality associated with an indicated aspect, if that type of restricted functionality is a default type of restricted functionality associated with the indicated aspect, based on prior preferences or other configuration performed by the user, etc.

In the illustrated embodiment, the user has interacted with the displayed Web page in such a manner as to indicate a particular aspect of the subject area of the Web page, and in particular in this example to indicate the product size aspect 258b corresponding to the "Product X" item subject area of the Web page. In various embodiments, a user may indicate an aspect corresponding to a subject area in various ways, such as by highlighting, clicking or otherwise interacting with one or more elements of the visual representation of the displayed Web page, including text, images, controls, and/or other elements in the displayed Web page. Furthermore, in the illustrated example, some portions of the displayed Web page are presented as being user-selectable controls (e.g., control 256 or a hyperlink, not shown) and other portions of the displayed Web page are not presented as being user-selectable (e.g., plain text that does not have an associated hyperlink or other action that is invoked based on an attempted left-click selection of the text). The displayed context menu may be provided in various embodiments for user indications of user-selectable portions of the displayed Web page and/or for user indications of portions of the displayed Web page that are not presented as being user-selectable. In this example, the product size aspect 258b is not user-selectable via a left-click selection, but the context menu 240 is displayed in response to a right-click interaction with a portion of the displayed Web page that corresponds to the product size aspect 258b (e.g., on top of the displayed text "Size" and/or "5×5×5 inches; 3 pounds", within a predefined distance or other specified proximity of that displayed text, closer to that displayed text than to displayed information for any other aspects, etc.). The Web browser extension program may receive an indication of the user interaction in various ways (e.g., such as via a callback event handler invoked by the host Web browser application) and determine which aspect (if any) that a user has indicated in various ways in various embodiments, such as, for example, by analyzing information proximate to a location of the user's interaction (e.g., by analyzing a DOM that provides metadata for the displayed Web page).

After the Web browser extension program determines an indicated aspect of the subject area for the user interaction, the program may provide the user with access in various ways in various embodiments to one or more types of restricted functionality that correspond to that aspect and for which the user is authorized. For example, in the illustrated embodiment, access to those restricted functionality types is provided by adding one or more user-selectable menu options to the context menu that correspond to those types of restricted functionality, while in other embodiments such access may be provided in other manners (e.g., via the user interface 210, via a separate window, by temporarily modifying the displayed Web page to bodily include one or more hyperlinks or buttons or other user-selectable controls, etc.). In addition, the context menu may be displayed in a manner that reflects the associated subject area aspect, such as at or near the location of the user's mouse click or other indication interaction, or otherwise near the associated subject area aspect. In some embodiments, the Web browser extension program may further filter and/or prioritize the access to the restricted functionality types for which a user is authorized, such as if the user is provided with only a subset of those restricted functionality types, and/or if an order or other manner of presentation of multiple restricted functionality types is altered to correspond to such prioritization. In this example, the user is provided access to the Edit product size menu option 245, such as based at least in part on the corresponding restricted functionality (e.g., an Edit product size tool) being relevant to the indicated aspect. If another aspect of the displayed Web page is instead indicated by the user in a similar manner, such as the Price aspect 254, the user may instead be provided with access to one or more types of restricted functionality that correspond to product price, but not be provided with access to the Edit product size functionality.

In some embodiments, the Web browser extension program may determine which restricted functionality types correspond to one or more indicated subject area aspects in various ways, such as based on a mapping of restricted functionality types to various aspects, while in other embodiments the extension program may not alter which restricted functionality types are made available in such a manner. In addition, it will be appreciated that one or more other types of restricted functionality may be provided for access in other embodiments, that other types of aspects and subject areas may be provided in other embodiments, and that users may interact with displayed Web pages in various other ways in other embodiments.

Figure 2C:
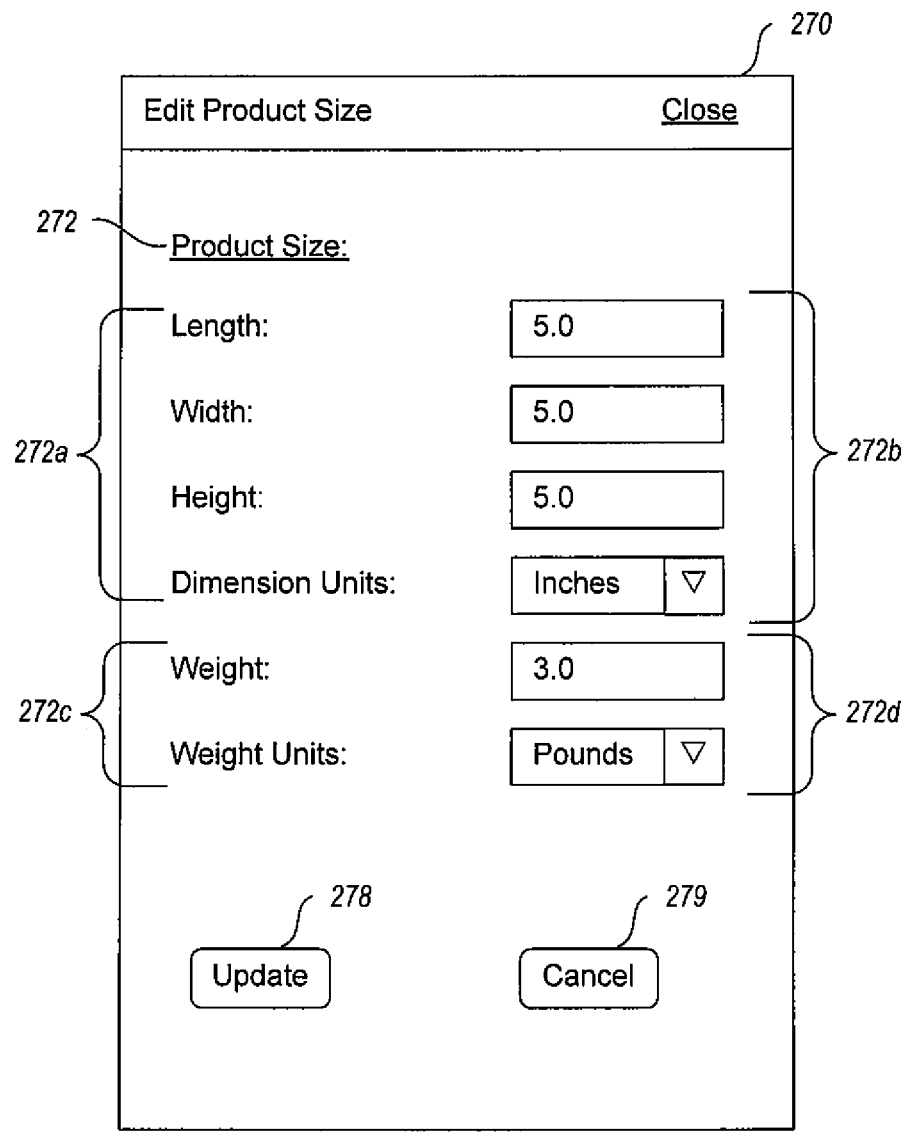

FIG. 2C illustrates an example user interface for providing a user with access to a particular type of restricted functionality. In particular, continuing the example of FIG. 2B, the user selects the "Edit product size" user-selectable option 245 from the context menu 240, and the illustrated user interface 270 is provided in response (e.g., as a pop-up window that is displayed over the user interface window 200). Alternatively, in other embodiments, the user interface 270 may be selected by the user in other manners, such as by selecting a user-selectable menu option (not shown) from dropdown menu 230 of FIG. 2A and/or from a sub-menu (not shown) corresponding to user-selectable control 246 of FIG. 2B. The example user interface 270 enables the user to access restricted functionality to edit information associated with the product size for the Product X item subject area of the displayed Web page of FIGS. 2A and 2B. In this example, the user interface 270 includes user-editable information associated with a product size 272, including information associated with product dimensions 272a (e.g., a length value, a width value, a height value, and corresponding dimension units), and information associated with product weight 272c (e.g., a weight value and weight units), such that a user may edit the product dimensions 272a and/or the product weight 272c by interacting with the displayed user-selectable controls 272b and 272d, respectively. After a user interacts with controls 272b and/or 272d to modify some or all of the displayed information, changes may be submitted based on the user selecting the Update button 278, such that the modified information may be sent to a remote computing system providing the restricted functionality to make corresponding changes to stored data. Alternatively, the user may select the Cancel 279 or Close user-selectable controls to cancel any modifications that the user may have entered and to exit the displayed user interface. In some embodiments, after a user performs such an information modification and update via interactions with restricted functionality, the modifications may be persistently stored such that the modified information is included when the Web page is obtained in the future. Thus, in this example, if the user modifies the Product X item weight to be 30 pounds (rather than the 3 pounds currently listed) and the Web page shown in FIG. 2A is re-displayed to a user (whether to the same user or any other user), the dimension aspect 258b of the re-displayed Web page would include that modified 30 pound weight information, and the fact that the weight information was recently changed would be transparent to the user to whom the Web page is re-displayed. Such ability to modify stored data may have various benefits, such as in this example to enable correct weight-based shipping charges to be determined for ordering the Product X item by correcting an incorrect weight value for the item.

In various embodiments, a user may invoke one or more types of restricted functionality in various ways, such that one or more applications, services, processes, and/or routines are executed on behalf of the user. For example, in at least some embodiments, invoking one or more types of restricted functionality on behalf of a user may cause one or more interactions to occur between a client computing system operating on behalf of the user and one or more remote computing systems (e.g., interactions including various communication protocols, such as HTTP, HTTPS, FTP, SNMP, SOAP, remote procedure calls, etc), such as one or more remote computing systems providing the restricted functionality. In addition, accessing one or more types of restricted functionality on behalf of a user may cause various additional information related to the restricted functionality to be displayed to the user in various ways in at least some embodiments. In various embodiments, user interfaces related to providing access to one or more types of restricted functionality may also be displayed to the user in various ways, including via pop-up windows, dialog boxes, application user interfaces, etc.

Figure 2D:
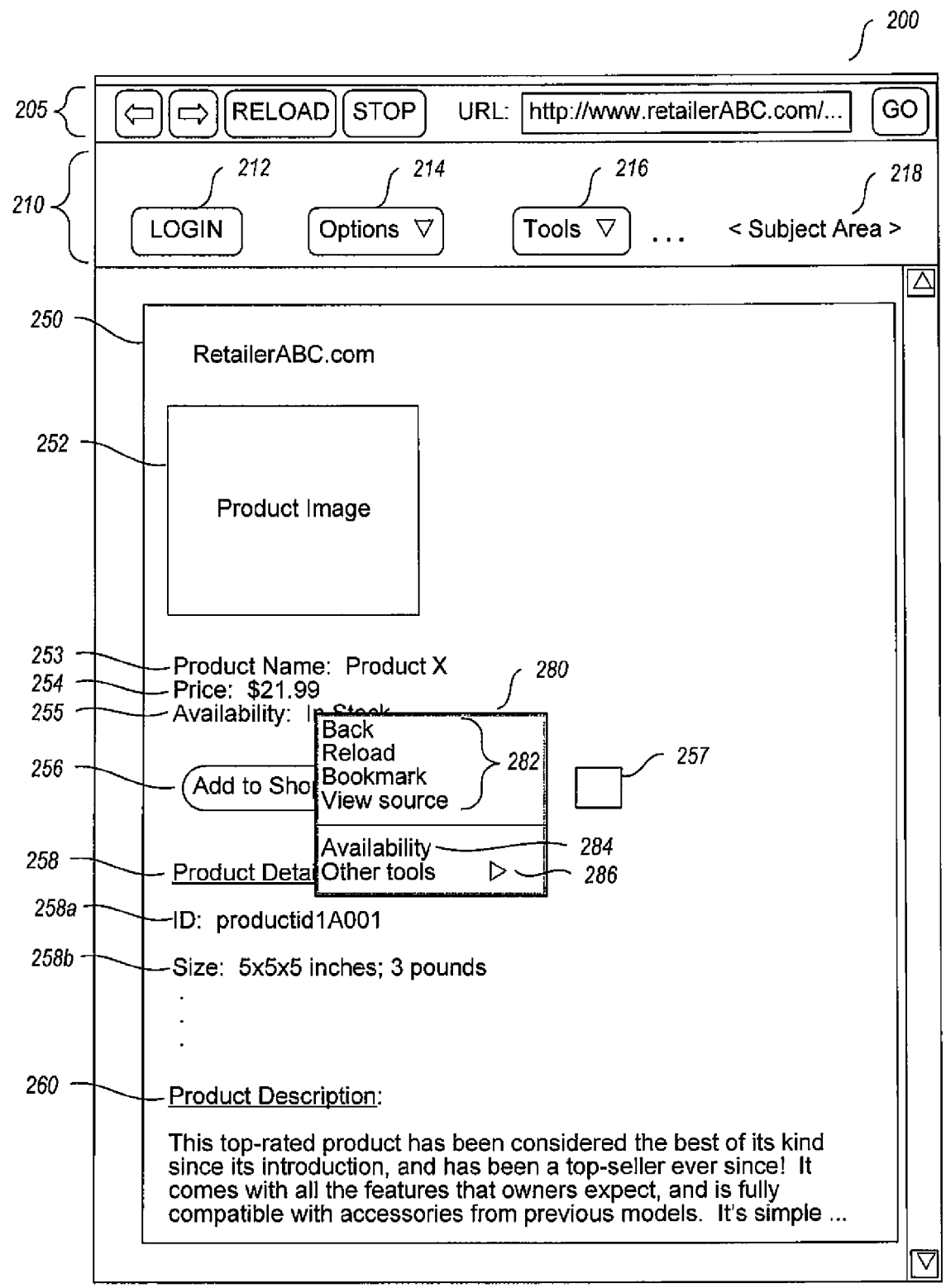

FIG. 2D continues the example of FIG. 2B, but with a context menu 280 being displayed in the Web browser user interface 200, such as resulting from a user performing an initial right click interaction with the displayed Web page. The displayed context menu 280 includes a number of default user-selectable menu options 282 (e.g., Back, Reload, Bookmark, and View source) that correspond to functionality provided by the Web browser, and one or more additional user-selectable options that may provide access to one or more types of restricted functionality, including an Availability menu option 284 and an Other tools submenu control 286. In the illustrated embodiment, the user has interacted with the displayed Web page to indicate the product availability information aspect 255 corresponding to the "Product X" item subject area of the Web page (e.g., such as by the user interacting with the displayed Web page in one or more manners as described with respect to FIG. 2B). For example, in this example, the context menu 280 may be displayed in response to the user performing a right click interaction with a portion of the displayed Web page that corresponds to the product availability information aspect 255 (e.g., on top of the displayed text "Availability" and/or "In Stock", within a predetermined distance or other specified proximity of the displayed text, etc.). In response to the user interaction, the user is provided access to the Availability menu option 284, such as based on associated restricted functionality for that option (e.g., an Availability tool) corresponding to the indicated aspect.

Figure 2E:
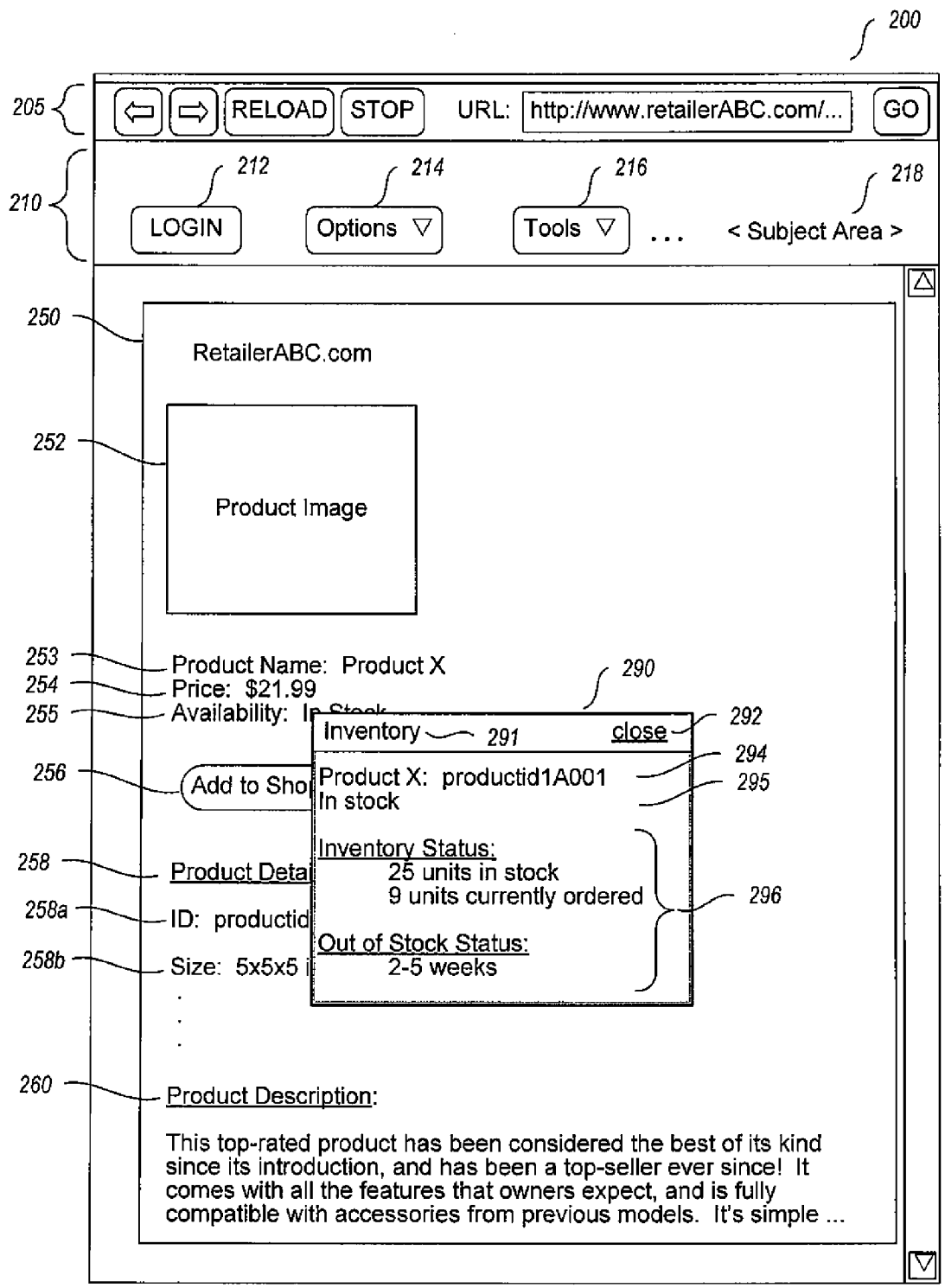

FIG. 2E illustrates an example embodiment of a user interface 290 that presents additional information associated with a particular type of restricted functionality. While such additional information may be presented in other manners in other embodiments (e.g., via a pop-up window, by modifying the presented information in the user interface 200 to bodily include the additional information as inline text, etc.), in the illustrated example the additional information is displayed to the user by temporarily modifying a copy of the Web page being presented to one or more HTML elements whose visual representation is the user interface 290. In particular, in this example, continuing the example of FIG. 2D, the user selects the "Availability" user-selectable option 284 from the context menu 280, and the illustrated user interface 290 is provided in response. In the illustrated embodiment, the selected type of restricted functionality and corresponding additional information in user interface 290 includes product inventory information associated with "Product X", such as information obtained from a remote computing system that provides restricted functionality for use by authorized users to obtain such information. In this case, the user interface 290 includes a product name and unique identifier 294, an indication of whether the product is currently in stock 295, and various other types of status information 296 associated with the product's availability (e.g., "Inventory Status", "Out of Stock Status", etc.), at least some of which may be confidential information obtained via the provided restricted functionality. In addition, in this example, the user interface 290 includes a "close" user-selectable control 292 so that the user may remove the displayed user interface 290 when so desired. While the user interface 290 has an appearance in this example similar to that of a pop-up window, it is part of the Web page displayed in the user interface 200 window rather than a separate window, and in some embodiments may not be dragged or otherwise moved by the user in such a manner as a separate pop-up window. Presenting the additional information as part of the displayed Web page has various benefits, including that any pop-up blocker functionality on the computing system executing the Web browser program will not detect or interfere with the additional information provided via the displayed Web page. The ability of the extension program to make changes that cause the additional information to be displayed, such as without triggering any pop-up blocker functionality or other alerts, is in at least some embodiments based on the extension program executing in a privileged or trusted manner, such as by being part of an extension mechanism for the Web browser program that the user has installed or otherwise approved. While not illustrated here, in some embodiments the additional information included within the user interface 290 may include one or more user-selectable controls as part of the content of the user interface 290.

As previously discussed, in some embodiments, a temporary copy of a Web page may be loaded into volatile memory for display to a user of a Web browser, with the displayed visual representation 250 being based on the temporary copy. In such embodiments, the temporary copy of the Web page may be temporarily modified to include information related to restricted functionality invoked by the user (e.g., such as additional information obtained by interacting with a remote computing system providing such functionality and/or user-selectable controls for accessing such restricted functionality), such as by inserting one or more HTML elements related to the information into the temporary Web page copy for presentation to the user via the Web browser as part of an updated visual representation. For example, in at least some embodiments, a restricted functionality access provider system, such as the Web browser extension program of FIGS. 2A-2E, may access a document object model (DOM) associated with the Web page being displayed, and insert one or more HTML elements (e.g., DIVs, SPANs, links, paragraphs, tables, etc.) and/or other types of information (e.g., text) corresponding to the restricted functionality information into the DOM. As such, it will be appreciated that the source Web page available from RetailerABC's Web site is not altered by such a modification, and another user on another computing system that obtains and presents that source Web page will receive the same visual representation 250 as shown in FIG. 2A. Similarly, if a copy of the source Web page is persistently stored locally on non-volatile memory of the computing system executing the Web browser (e.g., as a temporarily cached copy), that locally stored copy will also not be altered by such a modification. As one example of inserting elements into a DOM, in some embodiments, the following code excerpt may be used to insert a DIV element into a DOM:

toolElement=window.document.createElement('DIV');
    toolElement.id="restricted_tool_div";
    window.content.document.body.appendChild(toolElement);

Furthermore, while not illustrated here, the inserted DIV element may include an IFrame, such as to include a source reference to other or more remote documents or other resources that are used to generate the visual representation for the DIV element.

In at least some such embodiments, information related to the restricted functionality may be grouped as HTML content within a DIV element, such that the DIV element and its content may be presented to a user within a particular area of a Web page into which it is inserted. For example, in the illustrated embodiment of FIG. 2E, the information contained within the user interface 290 may be content within a DIV element that has been inserted into a DOM that corresponds to the displayed Web page, with the visual representation 290 of the DIV element being positioned within a particular area of the Web page visual representation 250 such that the information appears to overlay other information of the Web page. In particular, in this example, the user interface 290 is displayed in a position proximate to the aspect of the Web page with which the user initially interacted. In addition, the inserted DIV element may be removed from the DOM after the user has reviewed it, such as based on the user indicating to remove the displayed additional information (e.g., by selecting the close user-selectable control 292), based on expiration of a predefined period of time, etc.

In some embodiments, as in the illustrated example, information associated with particular restricted functionality may be displayed in close proximity to one or more aspects of the subject area of a Web page. For example, in some embodiments, the displayed user interface 290 may be displayed at a location that is proximate to a location of the user's interaction with the Web page visual representation 250, such as a location of a right click action that indicates an aspect associated with the subject area of the Web page. In some embodiments, the Web browser extension program may automatically determine where to display restricted functionality information in other manners, such as by analyzing the displayed Web page to determine one or more areas within the Web page that may be relevant to the restricted functionality, and automatically displaying the information proximate to the identified one or more areas. In other embodiments, information may be displayed in a predetermined location within a Web page, etc.

In addition, in other embodiments, other types of information and/or user-selectable controls related to restricted functionality may be presented in a manner similar to the techniques described with respect to FIG. 2E.

While various specific details are provided in FIGS. 2A-2E regarding examples of types of user interfaces and interactions related to facilitating access of users to restricted functionality, it will be appreciated that a variety of other types of information and functionality may be provided in a variety of other ways in other embodiments.

Figure 3:
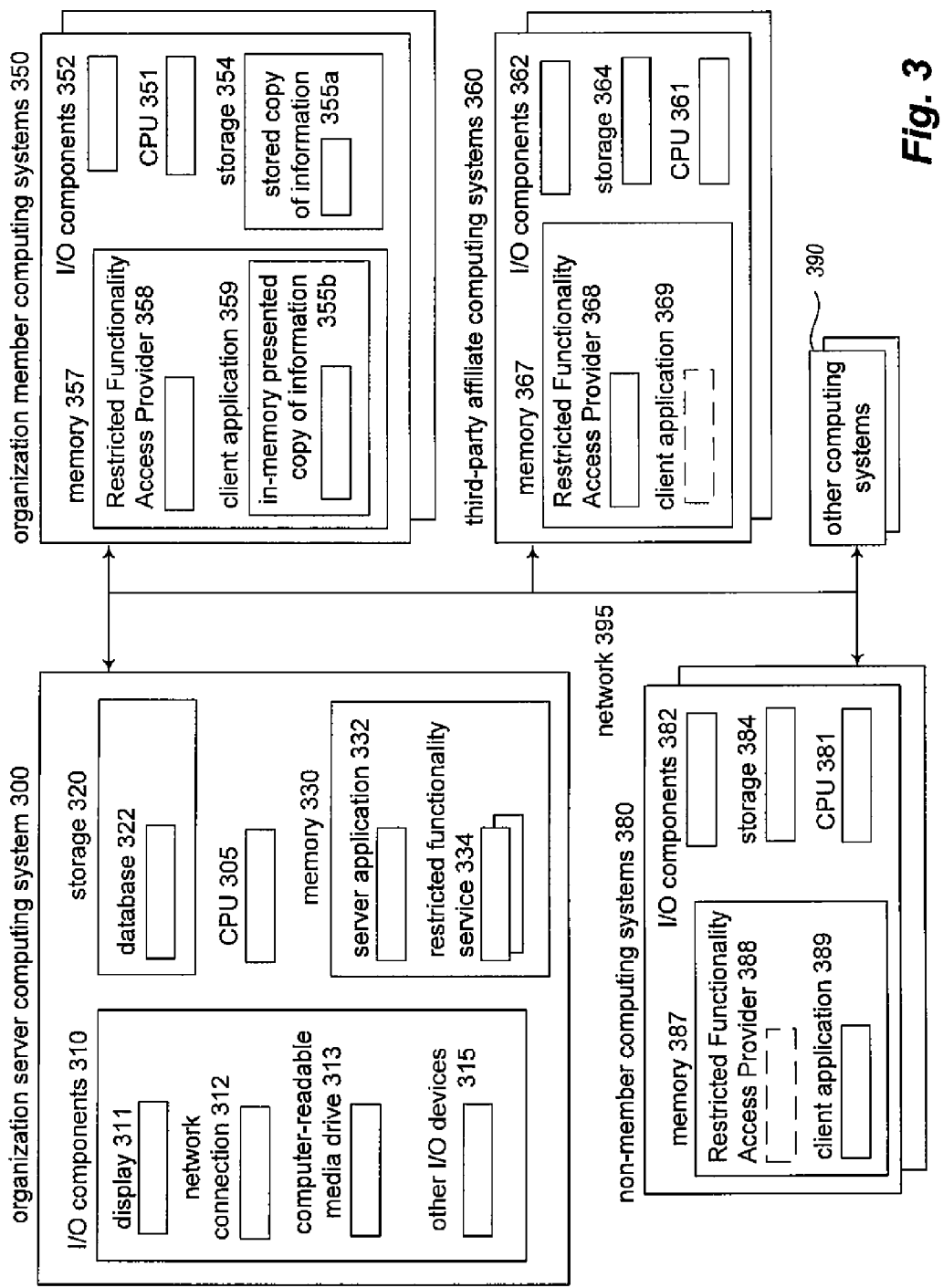
FIG. 3 is a block diagram illustrating computing systems suitable for executing an embodiment of a system for facilitating access to restricted functionality.

FIG. 3 is a block diagram illustrating computing systems suitable for executing an embodiment of a system that facilitates user access to restricted functionality, including an organization server computing system 300, organization member computing systems 350, third-party affiliate computing systems 360, non-member computing systems 380, and other computing systems 390. In this example embodiment, the organization server computing system 300 provides various information to client computing systems 350, 360 and 380 for presentation to users (not shown) of those client computing systems, and the client computing systems 350 and 360 that have authorized users use that presented information to provide access to the authorized users to restricted functionality available from the organization on whose behalf the organization server computing system 300 is operating.

In the illustrated embodiment, the organization server computing system 300 includes a CPU 305, various I/O ("input/output") components 310, storage 320, and memory 330. The illustrated I/O components include a display 311, a network connection 312, a computer-readable media drive 313, and other I/O devices 315 (e.g., mouse, keyboard, etc.). In this example, the organization server computing system 300 is executing a server application 332 in memory 330, and interacts with the other computing systems over a network 395. In some embodiments, the server application 332 may include a Web server for providing Web pages to client computing systems, such as based on data stored in database 322 of storage 320, while in other embodiments the server application may provide other types of electronically accessible information and/or functionality. For example, users of the various computing systems 350, 360, and 380 may initiate interactions with the server application 332 to obtain such information (e.g. Web pages and/or other information), such as by using client applications 359, 369, and 389 executing on the respective computing systems 350, 360, and 380. While not illustrated here, in some embodiments the server application may be part of an item ordering service or other business that provides information about items to users.

In addition to the server application 332, the organization server computing system 300 is executing one or more restricted functionality services 334 in memory 330 to provide restricted functionality to authorized users, such as internal functionality for the organization that is available to some or all employees or other members of the organization, and/or to other authorized users (e.g., users associated with affiliated organizations, such as part of a supply chain for the organization). As discussed in greater detail elsewhere, the restricted functionality may provide a variety of types of information and/or functionality to authorized users in various embodiments, such as, for example, access to obtain and/or modify internal data of the organization (e.g., such as data stored in database 322), access to internal systems of the organization (e.g., business tools), and access to use other types of functionality provided by the organization for use by authorized users (e.g., specialized tools, utilities, applications, etc.). In some embodiments, the server application 332 may further provide or interact with an authentication service (e.g., a certificate authority) to authenticate users, and the server application or the restricted functionality services or another system (not shown) may provide functionality to allow particular users and/or other entities (e.g., other businesses and organizations) to be designated as being authorized to access particular types of restricted functionality (e.g., based on the relationship of the users/entities to the organization). For example, users of the organization member computing systems 350 may be authorized to access a first group of at least some of the restricted functionality service 334 (e.g., based on being members of the organization), users of third-party affiliate computing systems 360 may be authorized to access a distinct second group of at least some of the restricted functionality services 334 (e.g., based on being affiliated with the organization in a predefined manner), and users of non-member computing systems may not authorized to access any of the restricted functionality services 334. While not illustrated here, the organization server computing system 300 may be part of a private network that includes computing systems of organization employee users or other member users (e.g., to include some or all of the computing systems 350 and/or computing systems 390), and those computing systems may include dedicated software applications (not shown) of the organization that allow those users to directly access some or all of the restricted functionality services 334. Furthermore, in some embodiments, only computing systems that are part of the private network may be able to obtain access to at least some of the restricted functionality services 334.

In the illustrated embodiment, each of the organization member computing systems 350 has components that include a CPU 351, various I/O components 352, storage 354, and memory 357. The I/O components may include components similar to those described with respect to the organization server computing system 300 (e.g., a display, a network connection, a computer-readable media drive, and other I/O devices, etc.). A client application 359 is executing in memory 357 that may interact with the server application 332, such as a Web browser program or other presentation program that obtains a group of information (e.g., a Web page) from the server application 332 and presents a visual representation of that information group on a display of the computing system 350. When the client application 359 obtains a Web page or other group of information from the server application 332, the client application may optionally store a copy 355*a* of the information on non-volatile storage 354 (e.g., a hard disk), and may further create a temporary copy 355*b* of the information in memory 357 (e.g., in part of the memory space of the client application) that is used to generate the visual representation on the display.

In addition, a Restricted Functionality Access Provider (RFAP) system 358 is executing in memory 357 in conjunction with client application 359. In some embodiments, the RFAP system may be a browser toolbar extension application executing in conjunction with a Web browser program, such as based on an API provided by the Web browser program that allows such an extension application to present a toolbar or other user interface as part of the user interface of the Web browser program. An organization member user of the computing system 350 may direct the client application 359 to interact with the server application 332 to obtain Web pages and/or other information for presentation to the user. In such embodiments, the RFAP system may determine that the information is being presented to the user in various ways (e.g., may receive an indication from the client application, such as an event, signal, callback, etc., that a Web page and/or other information has been presented to the user), and may determine whether to provide additional functionality to the user (e.g., access to some or all of the restricted functionality services 334) based at least in part on that presented information. In some embodiments, the RFAP system may identify the user as being an organization member (e.g., based on organization login information provided by the user and/or an interaction with the organization server computing system) and determine one or more of the restricted functionality services 334 that the user is authorized to access based on that status, or may determine one or more of the restricted functionality services 334 that the user is authorized to access in other ways in other embodiments (e.g., based on information previously stored on the computing system 350, such as a Web browser cookie, or based on the RFAP system itself, such as on a version of the RFAP system that is installed or that any copy of the RFAP system is present). As previously discussed, the restricted functionality services 334 may be of various types in various embodiments that each correspond to one or more types of information provided by the server application 332. Accordingly, in some embodiments and situations, the RFAP system may determine one or more of the restricted functionality services 334 that are related to the information currently being presented, and may further determine which restricted functionality services 334 to make available to the user based at least in part on the currently presented information.

The RFAP system may provide access to the user to determined restricted functionality services 334 in various ways in various embodiments. For example, as discussed in greater detail elsewhere, the RFAP system may add, enable or otherwise modify one or more user-selectable controls or other options available to the user (e.g., such as available via a user interface of the client application 359, via a user interface of the RFAP system, via the information being presented by the client application 359, etc.) in order to provide access to the determined restricted functionality services 334. In addition, in some embodiments, the RFAP system may detect one or more interactions of the user with the client application 359 and/or the RFAP system that select one or more of the user-selectable options, and provide functionality to the user based on one or more of the restricted functionality services 334 that correspond to the selected option(s). For example, functionality from the restricted functionality services may be provided to the user by programmatically interacting with those restricted functionality service(s) on computing system 300 on behalf of the user, such as to obtain corresponding additional information and provide the obtained additional information to the user (e.g., by presenting the additional information together with the information being presented by the client application, such as by modifying the temporary copy 355*b* in memory; by presenting the additional information via the user interface of the RFAP system; by presenting the additional information in a new window or other portion of the display device, such as via a pop-up window separate from a window used by the client application to display information; etc.). The user interaction that selects the user-selectable option(s) may include, for example, a left mouse click selection or other interaction by the user with a location within the displayed information (e.g., a particular sub-element of the displayed information), and if so the RFAP system may further determine one or more aspects of the presented information with which the user has interacted, and use that information to determine which of the restricted functionality services are relevant for those aspects and/or to determine where and how to present additional information to the user.

In the illustrated embodiment, each of the third-party affiliate computing systems 360 has components similar to those of the computing systems 350, including a CPU 361, various I/O components 362, storage 364, and memory 367. In memory 367, a copy of an RFAP system 368 is executing to provide access to restricted functionality services 334 as appropriate in a manner similar to that of RFAP system 358. In this example, however, the client application 369 executing in memory 367 is optional, such as to reflect that in some embodiments an RFAP system (such as system 368) may operate in conjunction with a client application (such as application 369) when present, but may otherwise provide some or all of the described types of functionality directly to a user in embodiments and situations in which the client application is not present. In some embodiments, the users of the third-party affiliate computing systems 360 may be authorized to obtain access to one or more groups of restricted functionality different from one or more groups of other restricted functionality available to the member users of the computing systems 350.

Each of the non-member computing systems 380 of the illustrated embodiment has components similar to those of computing systems 350 and 360, including a CPU 381, various I/O components 382, storage 384, and memory 387. In particular, as previously mentioned, a client application 389 is executing in memory 387, and may interact with the server application 332 to obtain Web pages and/or other information for presentation to a user. In this example, one or more of the non-member computing systems 380 may optionally be provided with a copy of the RFAP system, so that users may be provided access to the restricted functionality services 334 if those users are authorized for such access (e.g., based on the users being preferred customers of the organization, subscribed users of various services provided by the organization, etc.), although in other embodiments some or all of the computing systems 380 may not be provided with RFAP system copies.

The other computing systems 390 may provide various functionality, including providing other information (e.g., by including Web servers that provide Web pages for Web sites) that is publicly accessible and may also be obtained and presented by the client computing systems 350, 360 and 380, but without access to any restricted functionality being provided by the client computing systems based on that other information.

It will be appreciated that computing systems 300, 350, 360, 380 and 390 are merely illustrative and are not intended to limit the scope of the present invention. The computing systems 300, 350 and/or 360 may each instead be provided by multiple interacting computing systems or devices, and may be connected to other devices that are not illustrated, including through one or more networks such as the Internet, via the World Wide Web ("Web"), or via other electronic communications networks (e.g., private mobile communication networks). More generally, a "client" or "server" computing system or device may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the RFAP systems may in some embodiments be distributed in various components that are not shown. Similarly, in some embodiments, some of the functionality of the RFAP systems may not be provided, and/or other additional functionality may be available.

It will also be appreciated that, while various elements are discussed or illustrated as being stored in memory or on storage while being used, these elements or portions of them can be transferred between memory and other storage devices for purposes of memory management and data integrity. Alternatively, in other embodiments some or all of the software systems may execute in memory on another device and communicate with the illustrated computing systems via inter-computer communication. Furthermore, in some embodiments, some or all of the RFAP systems may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems and/or data structures may also be stored (e.g., as software instructions or structured data) on a computer-readable medium, such as a hard disk, a memory, a network, or a portable media article to be read by an appropriate drive or via an appropriate connection. The systems and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
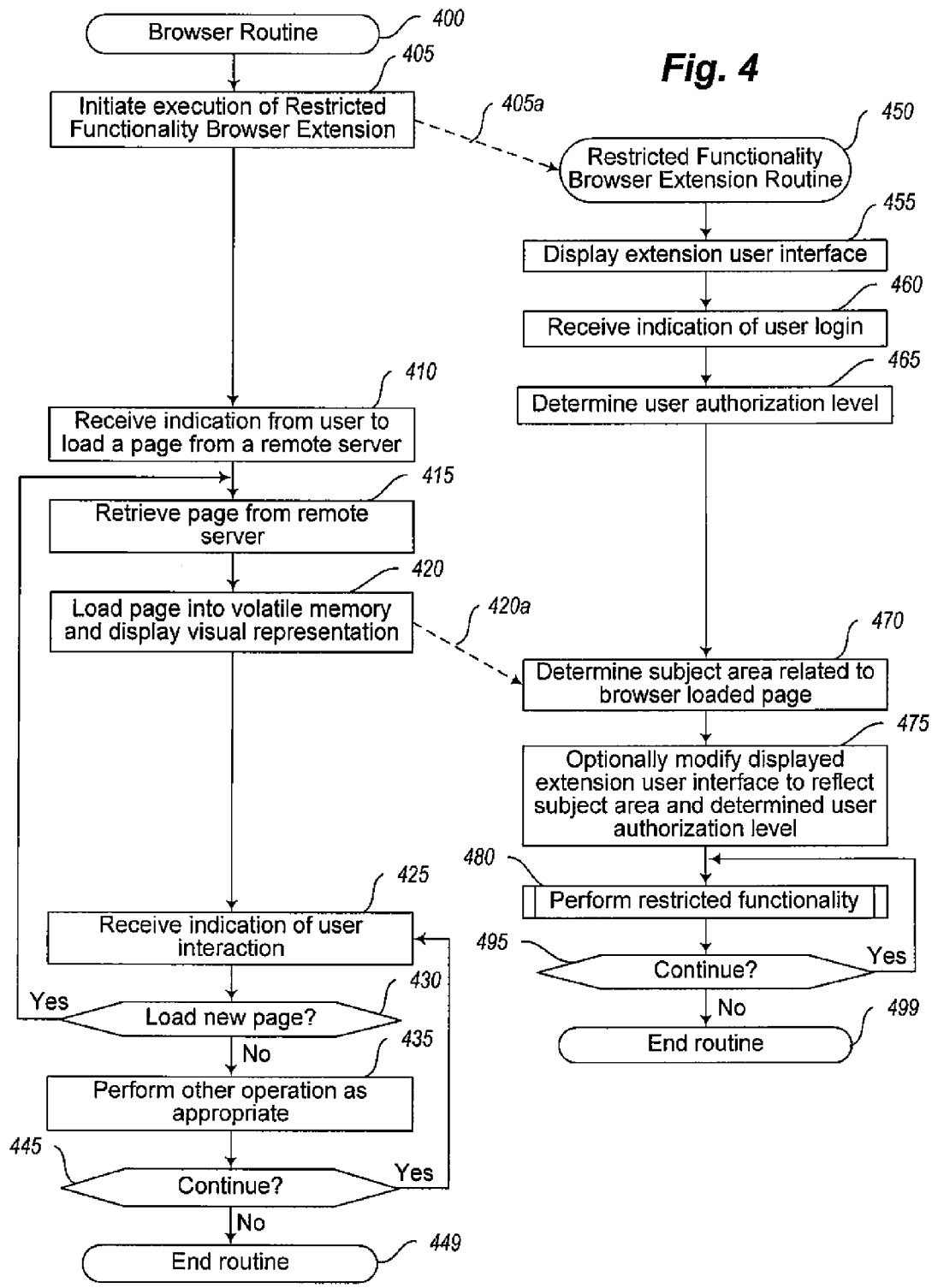
FIG. 4 illustrates flow diagrams of example embodiments of a Browser routine and a Restricted Functionality Browser Extension routine.

FIG. 4 illustrates an example embodiment of a Browser routine 400 and a Restricted Functionality Browser Extension routine 450. The Restricted Functionality Browser Extension routine 450 may, for example, be provided by execution of the Restricted Functionality Browser Extension systems 124 and 164 of FIG. 1 and/or the Restricted Functionality Access Provider systems 358, 368 and 388 of FIG. 3, such as to facilitate user access to restricted functionality. The Browser routine 400 may, for example, be provided by execution of the Web browsers 122, 142, and 162 of FIG. 1 and/or the client applications 359, 369, and 389 of FIG. 3, such as to facilitate access by users to information, such as by presenting publicly available Web pages obtained from Web sites. As discussed in greater detail elsewhere, the routine 450 executes in conjunction with the routine 400 in this illustrated embodiment, and thus both routines are illustrated together here to illustrate some interactions that may occur between the routines. In addition, in the illustrated embodiment, for the sake of brevity, the routine 400 illustrates only a subset of the features and functionality that may be provided by the Web browsers 122, 142, and 162 of FIG. 1 and/or client applications 359, 369, and 389 of FIG. 3, such as to correspond to related functionality of the routine 450.

The Browser routine 400 begins at block 405, where the routine initiates execution of the Restricted Functionality Browser Extension routine 450, such as indicated by indication 405a. In some embodiments, the Browser routine 400 may initiate execution of the routine 450 as part of its initialization or startup, such as at a time when previously configured plug-ins, add-ons, extensions, etc. for the routine 400 are invoked. In other embodiments, the routine 400 may initiate execution at other times after startup, such as based on a later instruction from a user of the routine 400, or based on the routine 450 becoming newly available at a later time. At some time after the routine 450 is initiated, the routine continues to block 410, where an indication is received from a user to load a page from a remote server (or in other situations to present a group of information from another source, such as a locally stored group of information), such as based on the user may entering a URL and/or selecting a hyperlink.

After block 410, the routine continues to block 415 to retrieve the indicated page from the remote server, such as by making a network request (e.g., HTTP, HTTPS, FTP, and/or other network communication protocol) to a remote server to retrieve the page. As discussed elsewhere, a page may, for example, be retrieved from a remote Web site provided by a business, such as a Web site operated by a business that provides items to customers, such that the retrieved page includes information and/or functionality associated with the business (e.g., pages that include descriptions of items, information about multiple items organized by category, user-selectable controls to provide search and browsing functionality, user-selectable controls to provide ordering functionality for selected items of interest, etc.). In other embodiments, pages may be retrieved from other types of Web sites, such as Web sites operated by other types of businesses or other types of entities (e.g., public entities, non-profit organizations, individuals, etc.). In block 420, the routine then loads a copy of the retrieved page into volatile memory accessible by the software application executing the routine 400, and displays a visual representation of the page to a user, such as via a graphical user interface of the software application executing the routine 400.

Meanwhile, after the routine 450 is invoked by the Browser routine 400 at block 405, the routine 450 begins at block 455, where the routine 450 displays a user interface to the user, such as a user interface that includes one or more user-selectable controls with which the user may interact. For example, in some embodiments, the user interface for routine 450 may be a toolbar user interface displayed as part of a user interface displayed by routine 400. After block 455, the routine 450 continues to block 460 to receive an indication of user login information or other identification information for a user of the routine 450, such as via one or more interactions by the user with the user interface displayed in block 455. In some embodiments, the user login information may include various types of user information provided by the user, such as a username, password, etc. In other embodiments, a user may instead be automatically logged in by the routine 450 without a current user interaction, such as if the user previously provided any such user information (e.g., username, password, etc.) and indicated to store that information for future automatic login. In other embodiments, at least some users may not be required to login, such as in embodiments where users may be authorized to use at least some restricted functionality in other manners, such as based on being able to execute the routine 450.

After block 460, the routine continues to block 465 to determine an authorization level of the user related to accessing restricted functionality, such as an authorization level associated with one or more groups of restricted functionality such that users having that authorization level may obtain access to the associated group of restricted functionality. In some embodiments, an authorization level may be assigned by the entity providing the restricted functionality to various users, such as based on various factors corresponding to a user's relationship with the entity (e.g., based on being an employee or contractor, based on a business relationship or other third-party affiliate such as a vendor or supplier, based on being a customer, etc.), a user's role with respect to an entity (e.g., position of employment, job requirements, etc.), etc. In other embodiments, a level of authorization may be determined in other manners, such as by being assigned to a user based on a subscription level of the user (e.g., for a user who subscribed to a particular service that includes a particular level of authorization to access a particular group of restricted functionality), or based on the user participating in a program offered by an entity that includes a particular level of authorization to access a particular group of restricted functionality (e.g., such as a beta program, user-testing program, etc.). In some embodiments, there may be only a single authorization level associated with restricted functionality, such that users are authorized to access all or none of the restricted functionality. In some embodiments, the routine may obtain the authorization level of a user by interacting with a remote authorization service, such as based on one or more digital certificates provided to or for the user from one or more certificate authorities.

At some time after block 465, the routine receives an indication 420*a* that a page has been loaded and displayed in block 420 of routine 400. The indication 420*a* may be received by the routine 450 in various ways in various embodiments. For example, in some embodiments, the indication 420*a* may be based on an event that triggers a registered event callback, such as an event indicating that a page has loaded. After the indication is received in block 470, the routine 450 determines a subject area related to the loaded page, such as by analyzing information included with the page (e.g., by parsing textual information that is part of the page, such as to identify one or more keywords or identifiers; by analyzing a DOM ("Document Object Model") associated with the presented page; via screen scraping, etc.), by analyzing information about a source of the page (e.g., based on a URL for the page or other indication of its location or source), by receiving information about the subject area as part of the indication 420*a*, etc. In some embodiments, various types of information included in the page by its provider may be specific to the provider and used to recognize various subject areas of the page, such as to identify an item from a page provided by an item retailer based on identifiers that the provider uses to indicate items.

After a subject area is determined in block 470, the routine continues to block 475 to optionally dynamically modify the user interface displayed in block 455 to reflect the determined subject area and user authorization level, such as to provide one or more user-selectable controls or other user-selectable options via that user interface with which the user may interact to access the restricted functionality. Such user-selectable options may be provided via that user interface and/or in other manners (e.g., via the page presented in block 420 of routine 400) in various embodiments, as further described with respect to block 480 and FIG. 5. The routine 450 may determine which restricted functionality that the user is authorized to access in various ways in various embodiments, such as based on the determined user authorization level and/or identified subject area. For example, in some embodiments, the routine 450 may have access to a mapping that indicates which restricted functionality corresponds to which subject areas and/or user authorization levels. The user-selectable controls and other options may include, for example, menu choices available from the displayed user interface, toolbar buttons, hyperlinks or menu choices available via the presented information (e.g., by modifying a copy of the page loaded in volatile memory), etc. In addition, in some embodiments, an indication of the determined subject area for the presented page may be displayed to the user in the user interface, such as to identify a particular item to which the page corresponds.

Figure 5:
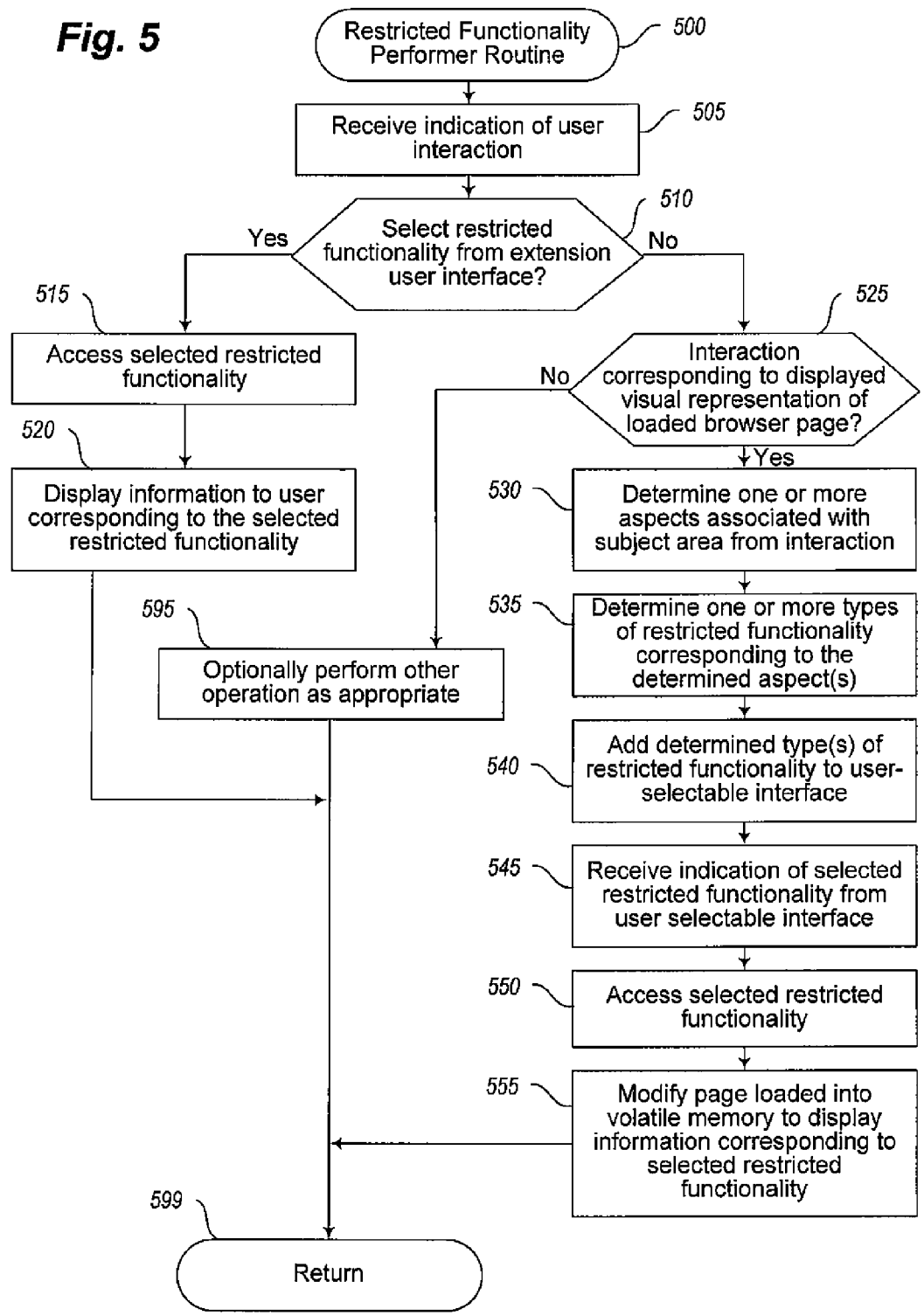
FIG. 5 is a flow diagram of an example embodiment of a Restricted Functionality Performer subroutine.

After block 475, the routine continues to block 480 to perform the restricted functionality subroutine, as discussed with respect to FIG. 5, so as to process any user interactions that correspond to accessing restricted functionality. In some embodiments, some or all of the user interactions that the routine 450 receives with respect to block 480 are initially received by the routine 400 and forwarded to the routine 450 (e.g., if the user interface displayed in block 455 is displayed as part of the user interface for the routine 400), although such interactions are not illustrated here for the sake of simplicity. After block 480, the routine proceeds to block 495 to determine whether to continue, such as to continue unless the user indicates to terminate the routine 450 or 400. If so, the routine returns to block 480, and if not continues to block 499 and ends.

With respect to routine 400, at some time after block 420, the routine continues to block 425 where an indication of a user interaction is received that is not directed to the user interface of routine 450 or otherwise to accessing restricted functionality, such as an interaction with a user interface of the software application executing the routine 400 and/or with the presented page in a manner that does not interact with any dynamically modified user-selectable options provided by the routine 450. The routine 400 then continues to block 430 to determine whether the user indication was to load and display a new page, and if so the routine returns to block 415. If not, the routine continues instead to block 435 to perform another indicated operation as appropriate (e.g., to modify a visual appearance of the displayed page, such as by changing a text size or zoom level, or to interact with a user-selectable control that was included as part of the original page provided to the routine 400 in block 420). After block 435, the routine proceeds to block 445 to determine whether to continue, such as unless the user indication was an instruction to terminate the routine. If so, the routine returns to block 425, and otherwise continues to block 449 and ends.

FIG. 5 is a flow diagram of an example embodiment of a Restricted Functionality Performer subroutine 500, such as to correspond to block 480 of FIG. 4. The subroutine 500 begins at block 505, where an indication is received of a user interaction that corresponds to the routine 450, such as an indication of a user interaction with the user interface displayed in block 455 and/or an interaction with the page displayed in block 420 that may correspond to accessing restricted functionality. In the illustrated embodiment, user-selectable options for accessing restricted functionality are provided to the user via the page displayed in block 420 as menu choices, which are displayed to the user after the user requests the menu based on an interaction with the displayed page (e.g., via a right-click interaction by the user on the displayed page), although in other embodiments the displayed page may be modified before block 505 (e.g., as part of block 475 of FIG. 4) to include one or more user-selectable controls that the user may directly select from the displayed page without the menu (e.g., as a new hyperlink added to the page). In the illustrated embodiment, after block 505, the routine continues to block 510 to determine whether the user has selected restricted functionality from the user interface displayed in block 455, such as from one or more user-selectable options made available in block 475 in FIG. 4 or via user-selectable controls that are always available as part of the user interface. If so, the routine continues to block 515 to access the restricted functionality that corresponds to the user interaction, such as on behalf of the user by interacting with a remote system. In some embodiments, the accessing of the selected restricted functionality may be available only to authenticated users, and if so the user may be authenticated in various ways (e.g., by providing a digital certificate identifying the user, such as may have been obtained in block 465 of FIG. 4; by providing authorization information supplied by the user, such as a username and password; etc.). After block 515, the routine continues to block 520 to display information corresponding to the selected restricted functionality to the user, such as information obtained from a remote system. The information may be displayed to the user in various ways in various embodiments, such as in a separate pop-up window, as part of the displayed page (e.g., by dynamically modifying the page, such as to insert one or more HTML elements), via the user interface displayed in block 455, etc.

If it is instead determined at block 510 that restricted functionality was not selected from the user interface, the routine continues instead to block 525 to determine whether the user interaction corresponds to the visual representation of the displayed page, such as to request that a menu of user-selectable options be displayed. If so, the routine continues to block 530 to determine from the interaction one or more page elements that correspond to the interaction (e.g., based on the location of the interaction), and one or more aspects of the subject area of the loaded page that correspond to those page elements. For example, in some embodiments, an overall subject area of a loaded page may have multiple attributes or other aspects that are represented in different pieces of information displayed as part of the page, and a user may indicate one or more of the associated aspects by interacting with corresponding displayed pieces of information. As one example, in some embodiments, multiple HTML elements may be part of the displayed page, and the user may interact with a particular HTML element (e.g., by clicking on information contained within the element). In such cases, the element or other corresponding piece of information may be identified in various ways (e.g., by analyzing a DOM associated with the corresponding HTML for the displayed page).

After block 530, the routine continues to block 535 to determine one or more types of restricted functionality corresponding to the determined subject area aspect(s), such as from a mapping as previously discussed. The routine then continues to block 540 to dynamically make available one or more user-selectable options corresponding to the determined restricted functionality, such as via menu choices for a menu that will be displayed to the user by the routine 400 based on the interaction of block 505.

In the illustrated embodiment, at some time after block 540, the routine receives an indication in block 545 of a selection by the user of restricted functionality based on the user-selectable options made available to the user in block 540 and/or block 475 of FIG. 4. While not illustrated here, the user may instead not select any of those user-selectable options in some situations, and if so the routine may instead proceed directly to block 599 without performing blocks 545-555 (e.g., after an indication that the user did not make a selection, such as by de-selecting a displayed menu; after a predetermined period of time expires without such a user selection; etc.). After block 545, the routine continues to block 550 and accesses the selected restricted functionality corresponding to the user selection, such as on behalf of the user in a manner similar to that of block 515. After block 550, the routine continues to block 555 to display information corresponding to the restricted functionality to the user in a manner similar to that of block 520, such as by temporarily modifying the page loaded into volatile memory to display the information or in one or more other manners. In some embodiments, the temporary page modifying may include temporarily inserting one or more HTML elements (e.g., DIV, SPAN, links, tables, etc.) corresponding to the information to be displayed, such that a new temporary visual representation generated from the modified page includes the inserted information. The temporary modification is then removed after the user has reviewed it, such as based on receipt of an instruction from the user to remove the information, based on expiration of a predefined period of time, etc.

If it is instead determined at block 525 that an interaction corresponding to the displayed page was not received, the routine proceeds instead to block 595 to optionally perform one or more other indicated operations as appropriate (e.g., to specify preferences for future operation of routine 450). After blocks 520, 555, or 595, the routine continues to block 599 and returns.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system to facilitate access by a user to restricted functionality, the method comprising:
under control of an executing first presentation software application on a configured computing system, obtaining a group of information related to a first subject area and presenting the group of information to the user of the computing system via a displayed user interface of the first presentation software application, the presented information being associated with an organization; and
under control of an executing second extension application for the first presentation software application on the configured computing system,
automatically identifying the first subject area of the presented group of information;
determining that the user belongs to a first group of users who are authorized to obtain access to one or more types of restricted functionality corresponding to the first subject area based at least in part on the first group of users being affiliated with the organization in a predefined manner, the one or more types of restricted functionality being provided by the organization in a restricted manner to users of the first group and not being available to other users who are not part of the first group; and
based at least in part on the determining, temporarily modifying one or more interactions that are available for selection by the user corresponding to the presented group of information, to enable the user to obtain access to the one or more types of restricted functionality via the modified available interactions, the temporary modifying including temporarily adding one or more user-selectable options that the user may select via the presented group of information in order to obtain the access to the one or more types of restricted functionality from the organization in the restricted manner.

2. The method of claim 1 further comprising, under control of the second extension application, after the user initiates at least one of the temporarily modified interactions while the group of information is being presented by the first presentation software application, providing to the user access to at least one of the restricted functionality types.

3. The method of claim 1 further comprising, under the control of the second extension application and after the first presentation software application presents the obtained group of information to a distinct second user, determining that the second user does not belong to the first group of users and preventing access of the second user to the one or more types of restricted functionality based at least in part on the determining that the second user does not belong to the first group of users.

4. The method of claim 1 further comprising, under the control of the second extension application and after the first presentation software application presents a distinct second group of information to the user, determining that the one or more types of restricted functionality do not correspond to an identified second subject area of the second group of information, and preventing access of the user to the one or more types of restricted functionality while the second group of information is presented based at least in part on the determining that the one or more types of restricted functionality do not correspond to the identified second subject area.

5. The method of claim 1 wherein the first presentation software application is a Web browser program, wherein the obtained group of information is a Web page obtained from a remote Web server, and wherein the second extension application is a toolbar extension program for the Web browser program.

6. The method of claim 5 wherein a user interface of the toolbar extension program is displayed to the user as part of the displayed user interface of the Web browser program, and wherein the modified interactions are available to the user via the displayed user interface of the toolbar extension program.

7. The method of claim 1 wherein the temporary modifying of the interactions that are available to the user includes dynamically modifying a menu of user-selectable options available to the user from an interaction with the presented group of information.

8. The method of claim 1 wherein the temporary modifying of the interactions that are available to the user includes dynamically modifying a copy of the group of information that is maintained in volatile memory by the first presentation software application and that is used to generate the presented group of information such that a presentation of the modified copy of the group of information includes access to one or more user-selectable options via an interaction with the presented modified copy of the group of information, the dynamic modifying being performed without persistently modifying a copy of the obtained group of information on non-volatile storage, such that a second presenting of the obtained group of information to the user from the non-volatile storage at a later time does not include changes from the modifying.

9. The method of claim 1 wherein the one or more types of restricted functionality provide access to one or more internal systems of the organization, and wherein the first group of users include users that have a predefined relationship with the organization.

10. The method of claim 9 wherein the organization is a business that provides information to consumers about items, wherein the predefined relationship of the first group of users with the business includes being employees of the business that have a designated role related to one or more of the items, wherein the group of information is provided by the business for access by customers that are not employees of the business, and wherein the identified first subject area of the presented group of information is related to at least one of the one or more items.

11. The method of claim 10 wherein the second extension application is provided by the business for use by the employees of the business having the designated role, and wherein the internal systems of the business include internal business tools for use in at least one of persistently modifying information stored by the business related to the items and of obtaining access to confidential business information of the business related to the items.

12. The method of claim 9 wherein the predefined relationship of the first group of users with the organization includes at least one of being a member of the organization, having an employment relationship with the organization, being associated with a third-party entity that is affiliated with the organization, being associated with a third-party business that has a defined type of business relationship with the organization, and being a preferred customer of the organization, and wherein the determining that the user belongs to the first group of users is based at least in part on information provided by the user to the second extension application.

13. The method of claim 1 wherein the automatic identifying of the first subject area of the presented group of information is based on at least one of content of the group of information that is presented, of metadata included with the group of information that is not presented, and of a source from which the group of information is obtained.

14. A non-transitory computer-readable medium whose contents configure a computing system to facilitate access by a user to restricted functionality, by performing a method comprising:
obtaining information from a business that is available to customers about items available via the business, the obtained information corresponding to one or more of the items;
presenting the obtained information to a user via a first user interface of an executing first presentation software application;
automatically identifying at least one of the one or more items to which the obtained information corresponds;
determining that the user is associated with the business in a predefined manner that authorizes the user to obtain access to one or more types of restricted functionality from the business, the one or more types of restricted functionality being related to the identified at least one item and not being available to users who are not associated with the business in the predefined manner; and
temporarily modifying interactions that are available for selection by the user corresponding to the presented information, to provide to enable the user to obtain access via the temporarily modified interactions to the one or more types of restricted functionality, the temporary modifying including temporarily adding one or more user-selectable options that the user may select in order to obtain the access to the one or more types of restricted functionality from the business.

15. The non-transitory computer-readable medium of claim 14 wherein the business is an item ordering service that provides ordered items to the customers of the business, wherein the predefined manner in which the user is associated with the business includes the user being an employee of the business, wherein the one or more types of restricted functionality from the business include the business providing access to confidential information that is not available to customers of the business that are not employees, and wherein the access to the one or more types of restricted functionality includes access to confidential information from the business about one or more of the at least one items.

16. The non-transitory computer-readable medium of claim 14 wherein the first presentation software application is executing on the configured computing system, wherein the temporary modifying of the interactions available to the user is performed under control of a second extension application for the first software application that is also executing on the configured computing system, and wherein the temporarily modified interactions are available to the user while the obtained information is presented to the user via one or more interactions with at least one of the presented information and a distinct second user interface of the second extension application.

17. The non-transitory computer-readable medium of claim 14 wherein the computer-readable medium is a memory of the configured computing system.

18. The non-transitory computer-readable medium of claim 14 wherein the contents are instructions that when executed program the configured computing system to perform the method.

19. A computing system configured to facilitate access by a user to restricted functionality, comprising:
one or more memories;
a presentation software application stored in the one or more memories that is configured to present information to one or more users, wherein the presentation software application presents the information via a displayed user interface of the presentation software application;
a software application stored in the one or more memories that is configured to execute in conjunction with the presentation software application while the presentation software application presents information to a user, the software application being an extension application for the presentation software application such that execution of the extension application in conjunction with the presentation software application includes displaying a distinct user interface of the extension application as part of the displayed user interface of the presentation software application, the software application being further configured to provide access to functionality based at least in part on the presented information by:
identifying a subject area of the presented information; and
if the user is allowed to obtain access to one or more types of functionality corresponding to the identified subject area, performing an impermanent modification to interactions available with the presented information so as to provide access to the user via the presented information to the one or more corresponding types of functionality, wherein the impermanent modification of the interactions available with the presented information is performed only if the extension application determines that the identified subject area of the presented information includes the presented information being associated with an organization and that the user is affiliated with the organization in a predefined manner, wherein the one or more types of functionality includes functionality that is provided by the organization in a restricted manner to only some users, and wherein the impermanent modification of the interactions available with the presented information includes temporarily adding one or more user-selectable options that the user may select via the presented information in order to obtain the access to the one or more types of functionality from the organization in the restricted manner.

20. The computing system of claim 19 wherein the software application includes instructions for execution by the computing system.

21. The computing system of claim 19 wherein the software application consists of a means for the providing of the access to the functionality based at least in part on the information presented by the presentation software application, and wherein the presentation software application consists of a means for the presenting of the information to the one or more users.

* * * * *

UNITED STATES PATENT AND TRADEMARK OFFICE
CERTIFICATE OF CORRECTION

| | | |
|---|---|---|
| PATENT NO. | : 8,606,656 B1 | Page 1 of 1 |
| APPLICATION NO. | : 12/058557 | |
| DATED | : December 10, 2013 | |
| INVENTOR(S) | : Patrick G. Franklin et al. | |

It is certified that error appears in the above-identified patent and that said Letters Patent is hereby corrected as shown below:

In the Claims

Column 32, Line 3, Claim 14:
"information, to provide to enable the user to obtain" should read, --information, to enable the user to obtain--.

Signed and Sealed this
Twenty-fourth Day of June, 2014

Michelle K. Lee
*Deputy Director of the United States Patent and Trademark Office*